United States Patent
Hamabe et al.

(10) Patent No.: US 9,439,114 B2
(45) Date of Patent: *Sep. 6, 2016

(54) RADIO COMMUNICATION SYSTEM AND METHOD

(71) Applicant: NEC CORPORATION, Tokyo (JP)

(72) Inventors: Kojiro Hamabe, Tokyo (JP); Jinsock Lee, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,598

(22) Filed: Jan. 12, 2015

(65) Prior Publication Data

US 2015/0126199 A1   May 7, 2015

Related U.S. Application Data

(63) Continuation of application No. 13/617,208, filed on Sep. 14, 2012, now Pat. No. 8,964,701, which is a continuation of application No. 12/680,144, filed as application No. PCT/JP2008/067295 on Sep. 25, 2008, now Pat. No. 8,369,286.

(30) Foreign Application Priority Data

Sep. 26, 2007 (JP) ................. 2007-249756

(51) Int. Cl.
*H04W 36/00* (2009.01)
*H04W 36/32* (2009.01)
*H04W 36/30* (2009.01)
*H04W 24/10* (2009.01)
*H04W 88/08* (2009.01)

(52) U.S. Cl.
CPC ......... *H04W 36/0094* (2013.01); *H04W 24/10* (2013.01); *H04W 36/30* (2013.01); *H04W 36/32* (2013.01); *H04W 88/08* (2013.01)

(58) Field of Classification Search
CPC ........... H04W 24/10; H04W 36/0094; H04W 36/32; H04W 36/30; H04W 88/08
See application file for complete search history.

(56) References Cited

U.S. PATENT DOCUMENTS

| 5,633,868 | A  | 5/1997 | Baldwin et al. |
| 6,064,890 | A  | 5/2000 | Hirose et al.  |
| 7,509,097 | B2 | 3/2009 | Irie et al.    |
| 7,920,525 | B2 | 4/2011 | Kim et al.     |

(Continued)

FOREIGN PATENT DOCUMENTS

| CN | 1941689 A   | 4/2007  |
| EP | 1986349 A1  | 10/2008 |

(Continued)

OTHER PUBLICATIONS

"Physical Layer Measurements for MBSFN", 3GPP TSG RAN WG1#49 (Kobe, Japan), R1-072146, May 7-11, 2007, 2 pages.

(Continued)

*Primary Examiner* — Brian D Nguyen
(74) *Attorney, Agent, or Firm* — Sughrue Mion, PLLC

(57) ABSTRACT

A mobile station determines, in accordance with reception quality of a radio signal from a base station, a measurement cycle of a predetermined measurement on a link status and/or on/off of the predetermined measurement and controls execution of the predetermined measurement based on the determination.

19 Claims, 19 Drawing Sheets

(56) References Cited

U.S. PATENT DOCUMENTS

| | | | |
|---|---|---|---|
| 8,620,319 B1* | 12/2013 | Thandu et al. | 455/436 |
| 2002/0072371 A1* | 6/2002 | Hokkanen | 455/438 |
| 2002/0119779 A1 | 8/2002 | Ishikawa et al. | |
| 2003/0153370 A1 | 8/2003 | Sako | |
| 2004/0058678 A1* | 3/2004 | deTorbal | 455/437 |
| 2004/0152480 A1* | 8/2004 | Willars et al. | 455/513 |
| 2005/0026626 A1* | 2/2005 | Carl et al. | 455/456.1 |
| 2005/0130645 A1* | 6/2005 | Albert Dobson et al. | 455/423 |
| 2005/0208966 A1 | 9/2005 | David et al. | |
| 2006/0128313 A1 | 6/2006 | Chang | |
| 2006/0183441 A1 | 8/2006 | Irie et al. | |
| 2006/0227745 A1* | 10/2006 | Olvera-Hernandez et al. | 370/331 |
| 2006/0252377 A1* | 11/2006 | Jeong et al. | 455/67.13 |
| 2007/0147553 A1 | 6/2007 | Bhat et al. | |
| 2007/0149234 A1 | 6/2007 | Bomash | |
| 2007/0264938 A1 | 11/2007 | Srinivasan et al. | |
| 2007/0287473 A1* | 12/2007 | Dupray | 455/456.1 |
| 2008/0004023 A1 | 1/2008 | Chen et al. | |
| 2008/0027715 A1* | 1/2008 | Rajendran et al. | 704/205 |
| 2008/0056197 A1 | 3/2008 | Ohtani et al. | |
| 2008/0095108 A1 | 4/2008 | Malladi et al. | |
| 2008/0096561 A1 | 4/2008 | Liu et al. | |
| 2008/0108367 A1* | 5/2008 | Afrashteh et al. | 455/452.2 |
| 2008/0119192 A1 | 5/2008 | Miyata | |
| 2008/0167089 A1 | 7/2008 | Suzuki et al. | |
| 2009/0047958 A1 | 2/2009 | Rimhagen et al. | |
| 2009/0156210 A1 | 6/2009 | Ponce De Leon et al. | |
| 2009/0156215 A1 | 6/2009 | Pitkamaki | |
| 2009/0239532 A1 | 9/2009 | Ebata | |
| 2009/0262654 A1 | 10/2009 | Iwamura et al. | |

FOREIGN PATENT DOCUMENTS

| | | |
|---|---|---|
| EP | 2019500 A1 | 1/2009 |
| EP | 2150069 A1 | 2/2010 |
| JP | 2001-285911 A | 10/2001 |
| JP | 2002-232929 A | 8/2002 |
| JP | 2003-244057 A | 8/2003 |
| JP | 2004-166056 A | 6/2004 |
| JP | 2006-229612 A | 8/2006 |
| JP | 2007-129672 A | 5/2007 |
| JP | 2007/094415 A1 | 8/2007 |
| WO | 2007094415 A1 | 8/2007 |
| WO | 2008054775 A2 | 5/2008 |
| WO | 2009117667 A1 | 9/2009 |

OTHER PUBLICATIONS

"UE Assistance for Self-Optimizing of Networks" 3GPP TSG-RAN WG2 (Orlando, USA), R2-072432, Jun. 25-29, 2007, pp. 1-4.

Examination Report dated Feb. 24, 2012 issued in Great Britain Application No. GB1006802.1.

Examination Report, dated Nov. 1, 2012, issued by the Intellectual Property Office of Great Britain in counterpart GB Application No. 1218757.1.

Office Action dated Feb. 26, 2013 issued by the Intellectual Property Office of the United Kingdom in counterpart British Patent Application No. GB1218757.1.

"Universal Mobile Telecommunications System (UMTS); User Equipment (UE) procedures in idle mode and procedures for cell reselection in connected mode", 3GPP TS 25.304 version 7.0.0 Release 7, ETSI TS 125 304 V7.0.0, Mar. 2006, 6 pgs.

Office Action dated Mar. 20, 2013, issued by the Intellectual Property Office of the United Kingdom in counterpart British Application No. GB1300223.3.

Japanese Office Action dated May 7, 2013 issued by the Japanese Patent Office in corresponding Japanese Patent Application No. 2009-534357.

Office Action dated Dec. 3, 2013 issued by the Japanese Patent Office in counterpart Japanese Patent Application No. 2013066628.

Communication dated Sep. 10, 2014 from the State Intellectual Property Office of the People's Republic of China in counterpart application No. 201210451281.3.

* cited by examiner

RADIO COMMUNICATION SYSTEM AND METHOD

CROSS REFERENCE TO RELATED APPLICATIONS

This application is a Continuation of U.S. application Ser. No. 13/617,208 (issued as U.S. Pat. No. 8,964,701), filed Sep. 14, 2012, which is a Continuation of U.S. application Ser. No. 12/680,144 (issued as U.S. Pat. No. 8,369,286), filed Mar. 25, 2010, which is a National Stage of International Application No. PCT/JP2008/067295 filed Sep. 25, 2008, claiming priority from Japanese Patent Application No. 2007-249756, filed Sep. 26, 2007. The above applications are incorporated herein by reference in their entirety.

TECHNICAL FIELD

The present invention relates to a radio communication system, and in particular to a system and a method for controlling a report about link status monitoring results acquired by a mobile station and transmitted to a base station.

BACKGROUND ART

Recently, along with the spread of mobile phones and the diversification of services therefor, a reduction of costs in maintaining mobile communication systems and adjusting such mobile communication systems for optimization is being requested. Examples of the items that need to be maintained and adjusted for optimization in such a mobile communication system include a transmission power level and an antenna tilt angle at a base station (which are also referred to as radio parameters) (see Patent Document 1).

The maintenance and adjustment of a communication system are generally performed based on an evaluation or examination which employs a radio network design simulator. In order to increase the accuracy of a simulation, information about reception statuses measured in service areas of a radio communication system and information about positions where measured values are obtained is input to the design simulator. For example, in a code division multiple access (CDMA) radio communication system, reception quality and strength of a common pilot channel are used as the reception status information.

Conventionally, the reception status information is measured by a dedicated measuring vehicle or a dedicated measuring team. Another conventional way is to have general mobile radio terminals owned by users measure the reception status information, to collect the measurement results. According to Patent Document 1, a mobile radio terminal monitors a user communication link status and detects, as a trigger, whether the link status satisfies a predetermined condition. When the trigger is detected, the mobile radio terminal acquires a radio signal reception status and the position of the mobile radio terminal. Next, the mobile radio terminal transmits measured information including the reception status and the position to a management server (information collection server), and the management server records the measured information received from the mobile radio terminal therein.

Patent Document 1: JP Patent Kokai Publication No. JP2004-166056 A
Non-Patent Document 1: "UE assistance for self-optimizing of network", 3GPP TSG-RAN WG2 R2-072432, 25-29 Jun. 2007

SUMMARY

The entire disclosures of Patent Document 1 and Non-Patent Document 1 are incorporated herein by reference thereto. The following analyses are made based on the present invention.

Based on Patent Document 1, a system in which a mobile station reports reception status monitoring results to a management server via a base station will be analyzed.

Based on indications from the management server, the base station transmits a measurement control notification (a periodical type, an event type, or an on-demand type) to the mobile station. In the case of the on-demand type, upon receiving a measurement control notification, the mobile station performs a measurement.

In the case of the periodical type, in response to a measurement control notification, the mobile station performs a measurement in a constant cycle.

In the case of the event type, while the mobile station monitors a link status, if an event corresponding to a predetermined condition, such as a radio link failure, a handover failure (HO failure), a reduction of throughput, or a degradation of pilot quality, occurs as a trigger, the mobile station reports an occurrence of the event to the base station.

As the monitoring results reported by the mobile station, a reception status and the position of the mobile station are transmitted and in the case of the event type, an event type the mobile station is transmitted as well. Pilot reception quality and global positioning system (GPS) position information about a serving cell (which is currently providing services and is also referred to as self-cell) and a neighboring cell(s) are used as the reception status and the information about the position of the mobile station. Further, temporary mobile station ID information (temporary mobile subscriber identification (TMSI); identifier of L3 (RRC)), time information, and the like may be included in the report. When the mobile station transmits link status monitoring results to the base station, if communication is disabled due to a radio link failure, a base station failure, or the like, the report is buffered in the mobile station. The buffered report is transmitted to the base station when the link connection is reestablished and communication is enabled.

Upon receiving the report from the mobile station, the base station transmits the report to the management server.

The management server collects information in the report and resets radio parameters such as power and an antenna tilt angle.

The present inventors analyzed the above system and found the following problems.

It is desirable to prohibit or suppress such an operation of performing measurements even in good reception quality areas where collection of measurement results is unnecessary and transmitting the measurement results by a mobile station to a management server via a base station, in consideration of the increase in power of the mobile station and radio network load.

The present inventors made intensive studies in order to develop an approach that enables measurements particularly on low link quality areas and that reduces terminal power consumed by measurements.

The present invention has been made based on the above finding, and it is an object of the present invention to provide a mobile terminal, a system, a method, a program, a base station, and a management server capable of suppressing an increase of power consumed in connection with a measurement on a link status and of network load.

The invention disclosed in the present application may generally be summarized as below:

According to one aspect of the present invention, there is provided a mobile terminal that determines, in accordance with reception quality of a radio signal from a base station, a measurement cycle of a predetermined measurement on a link status, performed by the mobile terminal and different from a measurement of the radio signal and/or on/off of the predetermined measurement and control execution of the predetermined measurement based on the determination.

According to another aspect of the present invention, there is provided a mobile terminal that compares radio quality of a cell with a predetermined threshold and controls a link status measurement different from a measurement of the radio signal, based on whether the radio quality of the cell is higher or lower than the threshold.

According to another aspect of the present invention, there is provided a radio communication system in which a mobile terminal is set in a predetermined mode responsive to an indication transmitted from a base station side and the mobile terminal in the predetermined mode determines a measurement cycle of a predetermined measurement on a link status performed by the mobile terminal to obtain link status information that is to be reported to a base station and different from a measurement of the radio signal and/or on/off of the predetermined measurement, based on a measurement result of reception quality of a radio signal from a base station, and controls execution of the predetermined measurement based on the determination.

According to another aspect of the present invention, there is provided a base station that provides a mobile terminal, which determines, in accordance with reception quality of a radio signal from a base station, a measurement cycle of a predetermined measurement on a link status performed by the mobile terminal and different from a measurement of the radio signal and/or on/off of the predetermined measurement and controls execution of the predetermined measurement, based on the determination, with the radio signal and that receives a result of the link status measurement performed by the mobile terminal and different from a measurement of the radio signal, from the mobile terminal.

According to another aspect of the present invention, there is provided a management server that receives, from a mobile terminal, which determines, in accordance with reception quality of a radio signal from a base station, a cycle of a measurement and/or on/off of the measurement and controls execution of a predetermined measurement on a link status performed by the mobile terminal and different from a measurement of the radio signal, based on the determination, a measurement report on the link status sent via the base station and optimize a radio parameter based on the measurement report.

According to another aspect of the present invention, there is provided a radio communication method in which a mobile terminal determines, in accordance with reception quality of a radio signal from a base station, a measurement cycle of a predetermined measurement on a link status performed by the mobile terminal and different from a measurement of the radio signal and/or on/off of the predetermined measurement and controls execution of the predetermined measurement based on the determination.

According to the present invention, there is provided a program causing a computer included in a mobile terminal to execute the above processing of the mobile terminal according to the present invention. According to the present invention, there is provided a computer readable recording medium which stores a program causing a computer included in a mobile terminal to execute the above processing of the mobile terminal according to the present invention.

According to the present invention, by causing a mobile terminal to control a cycle of a predetermined measurement on a link status and to perform on-off control of the measurement, frequent signaling between a base station and the mobile station can be avoided, power consumption by the measurement can be reduced, and an increase of network load can be suppressed.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

The present invention will be hereinafter described in more detail with reference to the attached drawings. In the following, one of the basic principles of the present invention will be first described, and exemplary embodiments will be next described.

Figure 1:
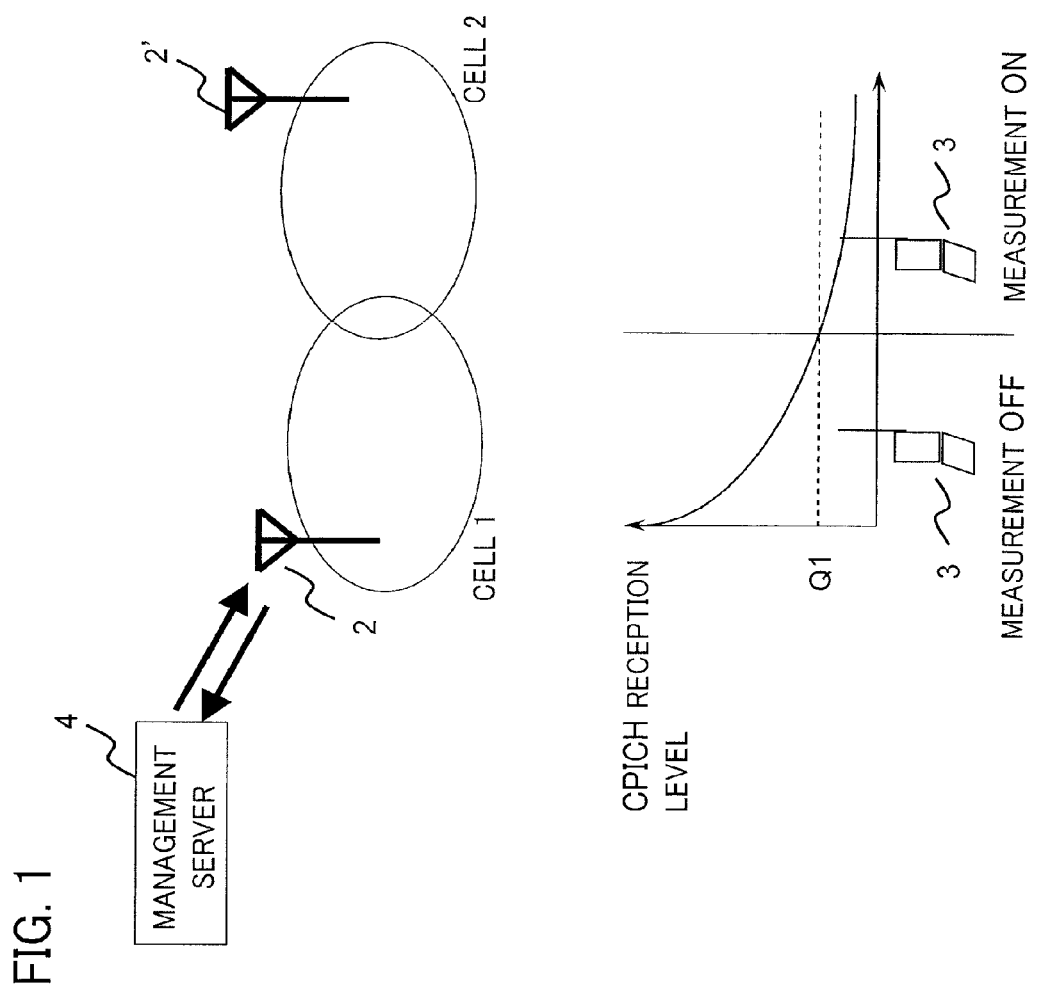
FIG. 1 is a diagram illustrating a mode of the present invention.

FIG. 1 is a diagram schematically illustrating one of operating principles according to one aspect of the present invention. As illustrated in FIG. 1, when the quality of a reception level or the like of a pilot signal (common pilot channel (CPICH)) from a base station 2 exceeds a predetermined threshold Q1 in a cell 1, a mobile station (mobile terminal) 3 does not perform a predetermined measurement on a link status such as a reception status ("measurement OFF" in FIG. 1), and when the pilot signal reception level is less than or equal to the predetermined threshold Q1, the mobile station 3 performs the predetermined measurement on a link status ("measurement ON" in FIG. 1). For example, when the mobile station 3 is located in a center of the cell and the pilot signal reception quality is good, the mobile station 3 switches off the predetermined measurement (OFF). On the other hand, when the pilot signal reception quality is low, the mobile station 3 switches on the predetermined measurement (ON). In this way, the mobile station 3 can selectively perform measurement on an area where the reception quality is low.

In the mobile station, turning on a predetermined measurement means allowing to execute, that is, enabling the predetermined measurement on a link status such as a reception status, which is used in reporting the measurement result to the base station 2. Measurement items of the predetermined measurement include pilot reception quality and global positioning system (GPS) position information of a cell in which the mobile station currently resides and a neighboring cell(s). When the measurement is on, measurement result data is stored and held to be used for a report.

On the other hand, in the mobile station, turning off a predetermined measurement means prohibiting the predetermined measurement, which is used in reporting the measurement result to the base station 2. When measuring periodically the reception level of a pilot signal from the base station, if the measurement is off, the measurement result is not used for a measurement report, and therefore, the mobile station may discard the measurement result (alternatively, when the measurement result is temporarily stored, the measurement result may be deleted later at a predetermined trigger). Further, when the measurement is off, regarding the periodical measurement of the pilot signal reception level, a position measurement performed by a GPS receiver in connection with the measurement may not be performed. Thus, in case the pilot signal reception level exceeds the threshold Q1, the mobile station switches off the measurement of the link status. In this way, it is possible to suppress the mobile station to transmit a report of the link status measurement results obtained in areas where radio quality is good, to the management server via the base station.

The link status includes link conditions determined by pilot signal reception quality (a decrease of the reception level, for example) of the link or another link(s), such as a link error and a link failure.

According to the present invention, since the measurement of the link status is autonomously controlled on the mobile station side in this way, measurement-related signaling between the base station and the mobile station is suppressed. Further, while the mobile station 3 transmits measurement information necessary for optimization to the management server 4, which optimizes radio parameters upon receiving a measurement result report, via the base station 2, the mobile station 3 avoids transmission of measurement information ineffective or unnecessary for optimization. As a result, power consumption and radio network load can be reduced. The present invention will be hereinafter described based on exemplary embodiments.

EXEMPLARY EMBODIMENTS

Figure 2:
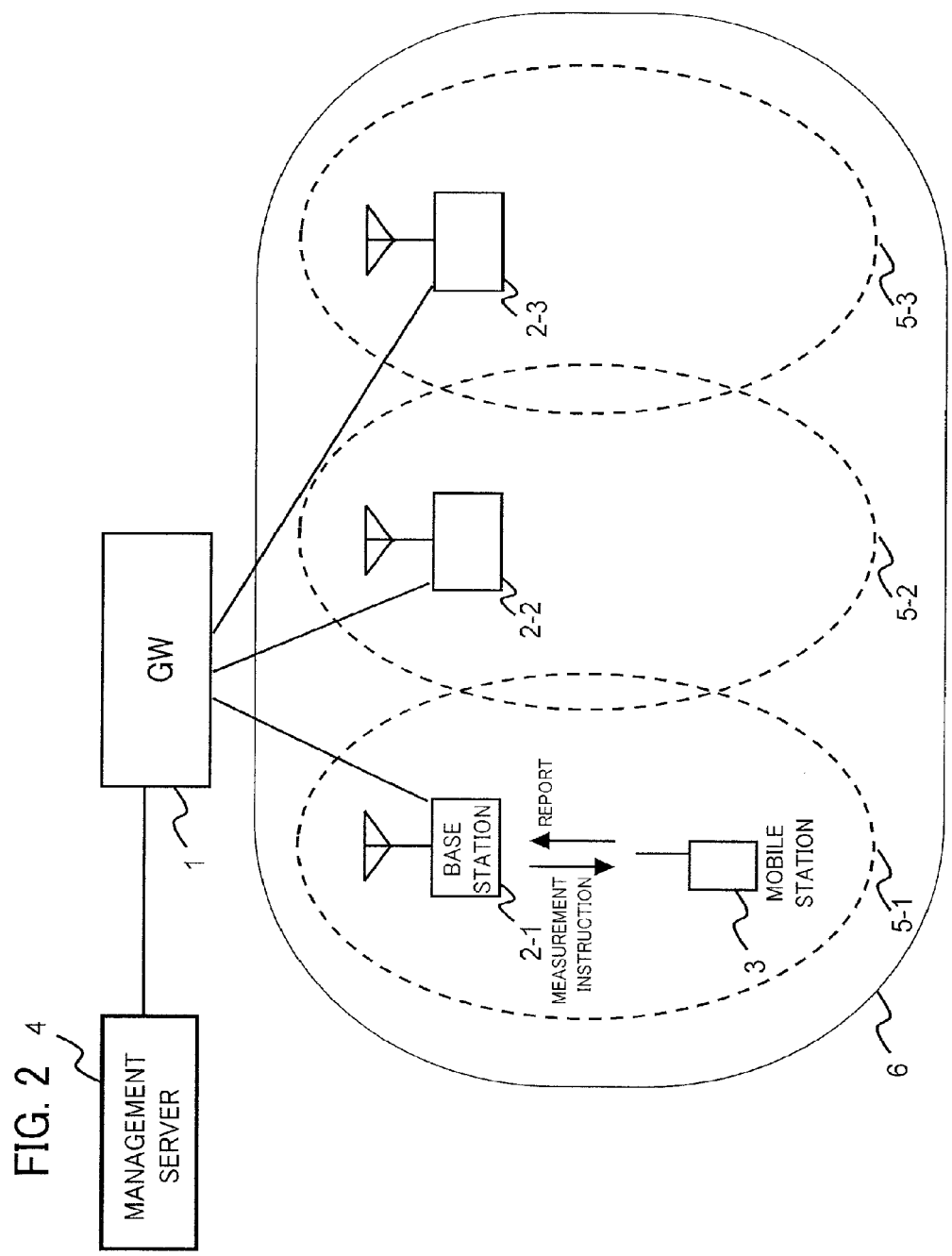
FIG. 2 is a diagram showing a system configuration according to an exemplary embodiment of the present invention.

FIG. 2 is a diagram showing illustrates a system configuration according to an exemplary embodiment of the present invention. In FIG. 2, a system according to the present exemplary embodiment includes a plurality of base stations (2-1, 2-2, and 2-3), a gateway (GW) 1 connected to the plurality of base stations, and a management server 4 connected to the gateway 1.

The base stations (2-1, 2-2, and 2-3) receive measurement indications from the management server 4 and notify a mobile station 3 that belongs thereto of the measurement indication. While not particularly limited, in addition to a periodical type, an event type, and an on-demand type, types of the measurement indication include an autonomous type, which is proposed by the present invention. In the case of the periodical type, the mobile station 3 periodically reports a monitoring result. In the case of the on-demand type, upon receiving the measurement indication, the mobile station 3 reports pilot reception quality of the self-cell and a neighboring cell(s), GPS position information, temporary mobile station ID information (TMSI), the time, and the like. In the case of the event type, when a predetermined event (a radio link failure, for example) occurs, the mobile station 3 transmits report information to the base station. The information includes the type of the event, pilot reception quality of the self-cell and a neighboring cell(s), GPS position information, temporary mobile station ID information (TMSI), the time and the like.

In the case of the autonomous type, depending on the pilot signal reception level, the mobile station 3 switches on/off of the measurement on the link status and sets a measurement cycle of the link status. For example, when the pilot signal reception level is greater than or equal to a predetermined threshold, the mobile station 3 switches off the measurement of the link status or extends the measurement cycle of the link status.

In contrast, when the pilot signal reception level falls below the threshold, the mobile station 3 switches on the measurement of the link status. Alternatively, the mobile station 3 shortens the measurement cycle of the link status, compared with when the pilot signal reception level is greater than or equal to the predetermined threshold.

Next, the base stations, the mobile station, and the management server in the system illustrated in FIG. 2 will be described with reference to FIGS. 5 to 7. To facilitate understanding, the functions of each of the above elements are illustrated separately by blocks and will be hereinafter described. Needless to say, the present invention is not limited to the following constitution.

Figure 3:
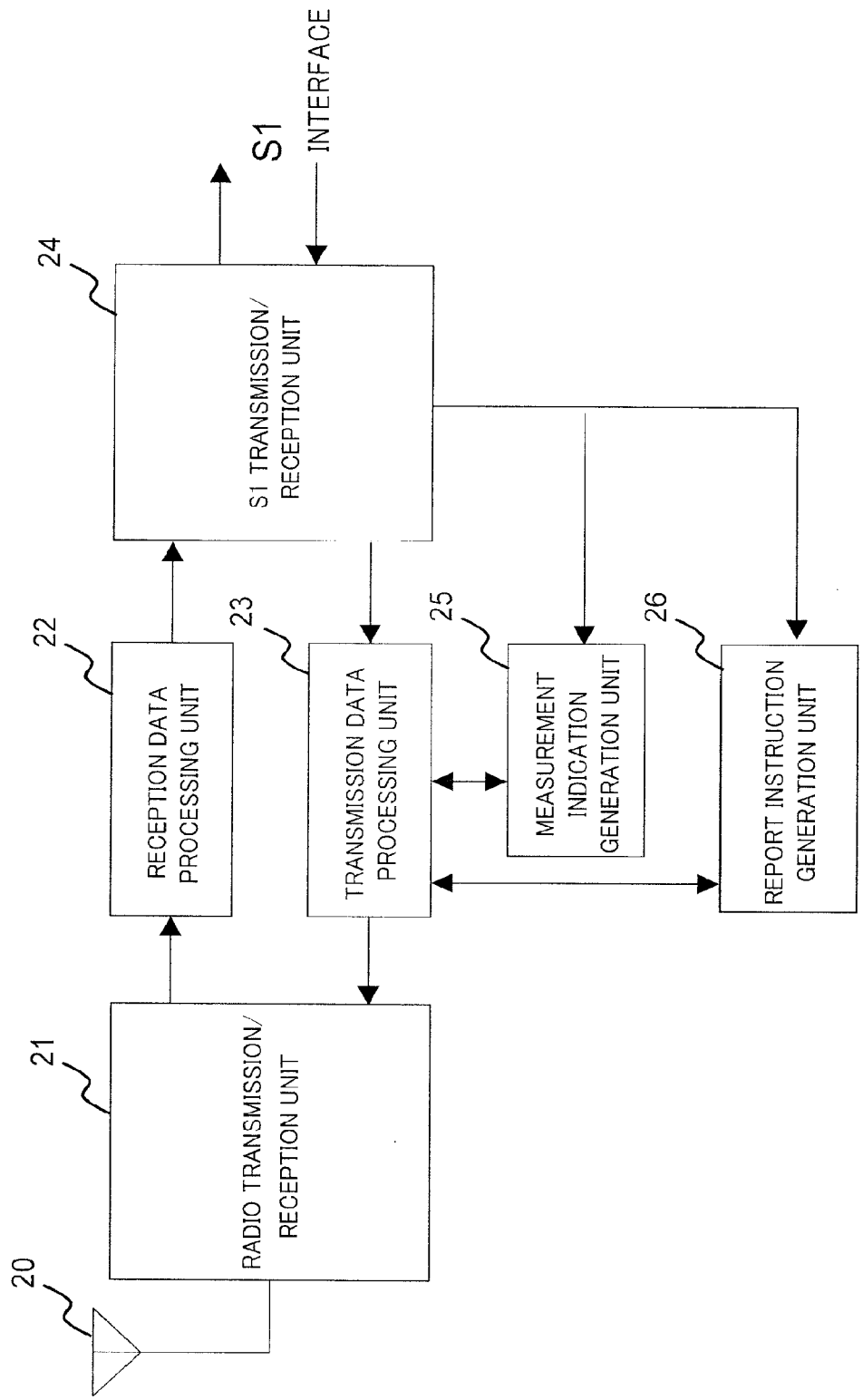
FIG. 3 is a diagram showing a configuration of a base station according to an exemplary embodiment of the present invention.

FIG. 3 illustrates a configuration example of the base station. In FIG. 3, the base station includes an antenna 20, a radio transmission/reception unit 21, a reception data processing unit 22, a transmission data processing unit 23, an S1 transmission/reception unit 24, a measurement indication generation unit 25, and a report indication generation unit 26. Each of these elements generally has the following functions.

The transmission data processing unit 23 performs error correction encoding and data modulation on transmission data (in case of CDMA, after spreading the data by a spread code) and converts the data into an analog signal. A transmission unit (not illustrated) of the radio transmission/reception unit 21 amplifies power of an RF signal obtained by performing a modulation and a frequency conversion on the transmission data from the transmission data processing unit 23. The transmission unit then supplies the signal to the antenna 20 via a duplexer (not illustrated). The signal received by the antenna 20 is transmitted to a reception unit (not illustrated) of the radio transmission/reception unit 21 via the duplexer (not illustrated). The received RF signal is amplified, the frequency thereof is converted, and the signal is then demodulated. Subsequently, the resultant signal is supplied to the reception data processing unit 22.

The reception data processing unit 22 converts the received signal (analog signal, for example) into a digital signal (in case of CDMA, after de-spreading the signal with the same spread code as that used for the received signal and a rake combination or the like is performed on the obtained signal), and performs data demodulation and error correction decoding. Further, the reception data processing unit 22 sends monitoring result report information in the received data to the S1 transmission/reception unit 24, which then sends the information to the management server (4 in FIG. 2) via the gateway (1 in FIG. 2).

The measurement indication generation unit 25 generates measurement indications transmitted to the mobile station. For example, based on measurement indications (which includes at least a cell(s) to be measured and items to be measured) issued from the management server 4 (which will be described later with reference to FIG. 5), the measurement indication generation unit 25 generates measurement indications directed to the mobile station that set a radio link in the cell(s) to be measured.

The report indication generation unit 26 notifies the mobile station of measurement result report instructions via the transmission data processing unit 23 and the radio transmission/reception unit 21.

Figure 4:
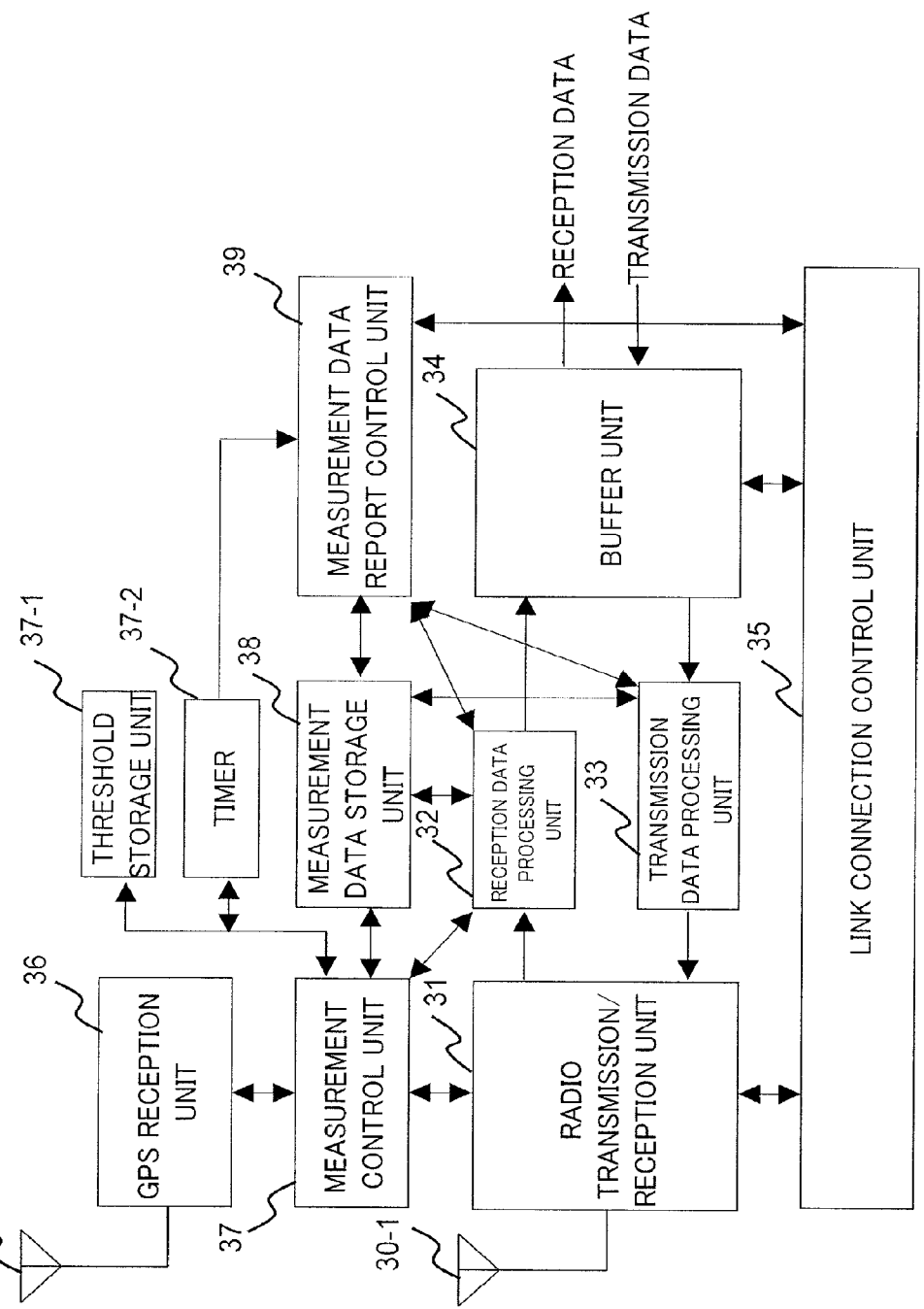
FIG. 4 is a diagram showing a configuration of a mobile station according to an exemplary embodiment of the present invention.

FIG. 4 is a diagram showing a configuration example of the mobile station. Referring to FIG. 4, the mobile station includes a radio transmission/reception unit 31, a reception data processing unit 32, a transmission data processing unit 33, a buffer unit 34, a link connection control unit 35, a GPS reception unit 36, a measurement control unit 37, a threshold storage unit 37-1, a timer 37-2, a measurement data storage unit 38, and a measurement data report control unit 39. Each of these elements generally has the following functions. The buffer unit 34 stores transmission data and received data, and only one buffer unit 34 is illustrated in FIG. 3 for simplicity. However, needless to say, more than one buffer unit 34 may be separately used as a transmission data buffer and a reception data buffer.

The transmission data processing unit 33 performs error correction encoding and data modulation on the transmission data stored in the buffer unit 34 (in case of CDMA, after spreading the data by a spread code), and converts the data into an analog signal. A transmission unit (not illustrated) of the radio transmission/reception unit 31 amplifies power of an RF signal obtained by performing a modulation and a frequency conversion on the transmission data from the transmission data processing unit 33. The transmission unit then supplies the signal to the antenna 30-1 via a duplexer (not illustrated). A reception unit (not illustrated) of the radio transmission/reception unit 31 receives the signal from the antenna 30-1 via a duplexer (not illustrated), and the received RF signal is then amplified, the frequency thereof is converted, and the signal is then demodulated. Subsequently, the resultant signal is supplied to the reception data processing unit 32.

The reception data processing unit 32 converts the received signal into a digital signal (in case of CDMA, after de-spreading the signal with the same spread code as that used for the received signal and performing a rake combination or the like on the obtained signal). The reception data processing unit 32 performs data demodulation and error correction decoding on the data, and the data is then stored in the buffer unit 34. The received data temporarily stored in the buffer unit 34 is read and used for individual purposes.

The link connection control unit 35 performs various control operations between the mobile station and the base station. For example, the link connection control unit 35 controls establishment of a link connection, re-transmission when an error such as a time-out occurs, maintenance of connection, disconnection, and so forth.

The GPS reception unit 36 receives a signal from a GPS satellite via an antenna 30-2 and calculates position information (longitude, latitude, and height).

Based on a measurement indication received by the radio transmission/reception unit 31 (the measurement indication is transmitted from the base station), the measurement control unit 37 measures (monitors) a link status such as a reception status and stores the measurement result (monitoring result) in the measurement data storage unit 38. For example, the measurement result (monitoring result) is associated with the mobile station position information acquired by the GPS reception unit 36, mobile station ID information (TMSI), time information, and the like, and the associated data is stored for a subsequent report.

When an autonomous type measurement indication is transmitted from the base station, the measurement control unit 37 controls on/off of the measurement and sets a measurement cycle based on a pilot signal reception level. The measurement control unit 37 compares the pilot signal reception level received by the radio transmission/reception unit 31 with a predetermined threshold of the threshold storage unit 37-1. While the measurement control unit 37 of the mobile station measures a link status based on the measurement indication transmitted from the management server and the base station, needless to say, items to be measured are not limited to the pilot signal reception level (received power). For example, a ratio (Ec/Io) between a received power and an interference signal may be used as received power quality.

A threshold to be compared with the pilot signal reception level is stored in the threshold storage unit 37-1. Further, a cycle of the measurement (measurement cycle) performed to create a report and a time-out period of the timer 37-2 are stored as threshold information. Regarding these thresholds, standard values or default values may be stored in advance in the threshold storage unit 37-2. Alternatively, the threshold information may be included in control information transmitted to the mobile station from the base station where location registration or the like of the mobile station is conducted. In this case, the control information (threshold information) transmitted from the base station and received by the radio transmission/reception unit 31 and the reception data processing unit 32 is stored in the threshold storage unit 37-1 via the measurement control unit 37.

The timer 37-2 is used for various types of timing control, such as for management of a measurement cycle of the link status by the measurement control unit 37 and for management of a measurement data report timing by the measurement data report control unit 39. The timer 37-2 may be configured as a down-counter that has a time-out value and that counts down by a start signal (command) in response to a regularly supplied clock signal. In this case, when the count value reaches 0, the timer 37-2 notifies occurrence of a time-out. Alternatively, the timer 37-2 may be configured as an up-counter that counts up from 0. In this case, when the counter value reaches a time-out value, the timer 37-2 notifies occurrence of a time-out. Alternatively, depending on the length of the time-out period, the timer 37-2 may be configured as a software timer of which counter operation is executed by software. The timer 37-2 is controlled to stop the count operation thereof or reset the count value thereof based on a stop signal (command) or a reset signal (command) from the measurement control unit 37, respectively.

The measurement control unit 37 compares the pilot signal reception level (received power) received via the radio transmission/reception unit 31 and the reception data processing unit 32 with a threshold of the threshold storage unit 37-1. In case the reception level is greater than or equal to the threshold, the measurement control unit 37 switches off the measurement or sets a longer measurement cycle.

In case the pilot signal reception level falls below the threshold, the measurement control unit 37 switches on the measurement. Alternatively, in case the pilot signal reception level falls below the threshold, the measurement control unit 37 sets a shorter measurement cycle, compared with when the pilot signal reception level is greater than or equal to the predetermined threshold.

The measurement data report control unit 39 performs control to transmit a measurement result report or to prohibit transmission of the report, based on a link connection status and the like obtained by the link connection control unit 35. The measurement data report control unit 39 may be configured not to transmit a measurement result report stored in the measurement data storage unit 38, when the link connection control unit 35 detects a radio link failure. The measurement data report control unit 39 may be characterized in that transmit the report, when a radio link is reestablished or at a predetermined timing after a radio link has been reestablished. In this case, in order to disperse a concentration of measurement reports, the transmission of measurement reports may be stochastically performed, in such a manner to transmit a measurement report to the base station with a predetermined possibility (10%, for example).

The transmission data processing unit 33 receives an indication (an indication about whether to transmit a monitoring result report or prohibit transmission of the report) from the measurement data report control unit 39. When a monitoring result report needs to be transmitted, the transmission data processing unit 33 reads a measurement result, GPS position information, temporary mobile station ID information (TMSI), the time, and the like stored in the measurement data storage unit 38 and transmits the information associated with the temporary mobile station ID information (TMSI) and the like as a report via the radio transmission/reception unit 31. Needless to say, at least part of the processing performed by the measurement control unit 37 and the measurement data report control unit 39 in the mobile station may be implemented by a program that operates on a computer included in the mobile station.

Figure 5:
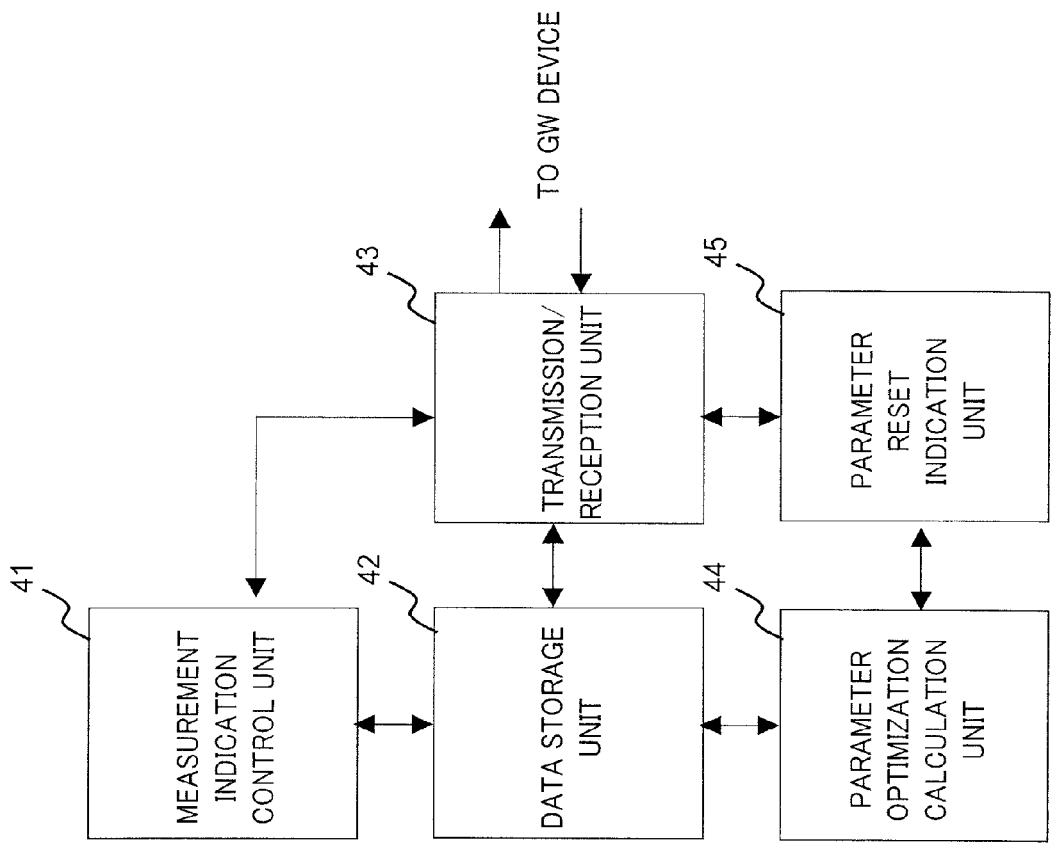
FIG. 5 is a diagram showing a configuration of a management server according to an exemplary embodiment of the present invention.

FIG. 5 illustrates a configuration example of the management server 4 illustrated in FIG. 2. Referring to FIG. 5, the management server 4 includes a measurement indication control unit 41, a data storage unit 42, a transmission/reception unit 43, a parameter optimization calculation unit 44, and a parameter reset indication unit 45. Each of these elements generally has the following functions.

The measurement indication control unit 41 issues a measurement indication to the mobile station via the base station. The measurement indication specifies the type of measurement (periodical type, event type, on-demand type, or autonomous type) and items to be measured. Needless to say, the type of measurement specified by the measurement indication is not limited to these types. For example, needless to say, a combination of the periodical type and the autonomous type, a combination of the event type and the autonomous type, or the like may be used. When a combination of the periodical type and the autonomous type is used, the mobile station periodically measures a link status based on the measurement indication from the base station. Specifically, however, in case the reception quality exceeds a predetermined threshold, the mobile station switches off the measurement or extends the measurement cycle. In case the reception quality is less than or equal to the predetermined threshold, the mobile station switches on the measurement and measures the link status periodically. In case a combination of the event type and the autonomous type is used, an event in which the reception level of a pilot signal becomes less than or equal to a threshold is registered in advance and control may be performed such that after the registered event occurs, in case the reception quality is less than or equal to the predetermined threshold, the mobile station may turn on the measurement, while in case the reception quality exceeds the threshold, the mobile station may turn off the measurement.

The measurement indication from the measurement indication control unit 41 is transferred to the gateway (GW device) (1 in FIG. 2) via the transmission/reception unit 43. The gateway transfers the measurement indication to the base station, and the base station notifies the mobile station in the cell by radio.

The transmission/reception unit 43 receives report information transmitted from the mobile station via the base station and the gateway (GW device) (1 in FIG. 2) and stores the received report information in the data storage unit 42.

The parameter optimization calculation unit 44 reads the report information from the data storage unit 42, and based on the report information, performs calculation to optimize one or more radio parameters, such as the power or the antenna tilt angle of a corresponding base station. When the radio parameters newly calculated by the parameter optimization calculation unit 44 are different from previously set radio parameters, the parameter reset indication unit 45 sends parameter reset indication to the base station via the gateway (1 in FIG. 2). Based on the received parameter reset indication, the base station sets the power, the antenna tilt angle, and the like.

Next, a second exemplary embodiment of the present invention will be described. FIG. 6 is a flow chart illustrating measurement control according to the second exemplary embodiment of the present invention. FIG. 7 is a schematic diagram schematically illustrating the measurement control according to the second exemplary embodiment of the present invention. The second exemplary embodiment of the present invention will be hereinafter described with reference to FIGS. 6, 7, and 4.

Figure 6:
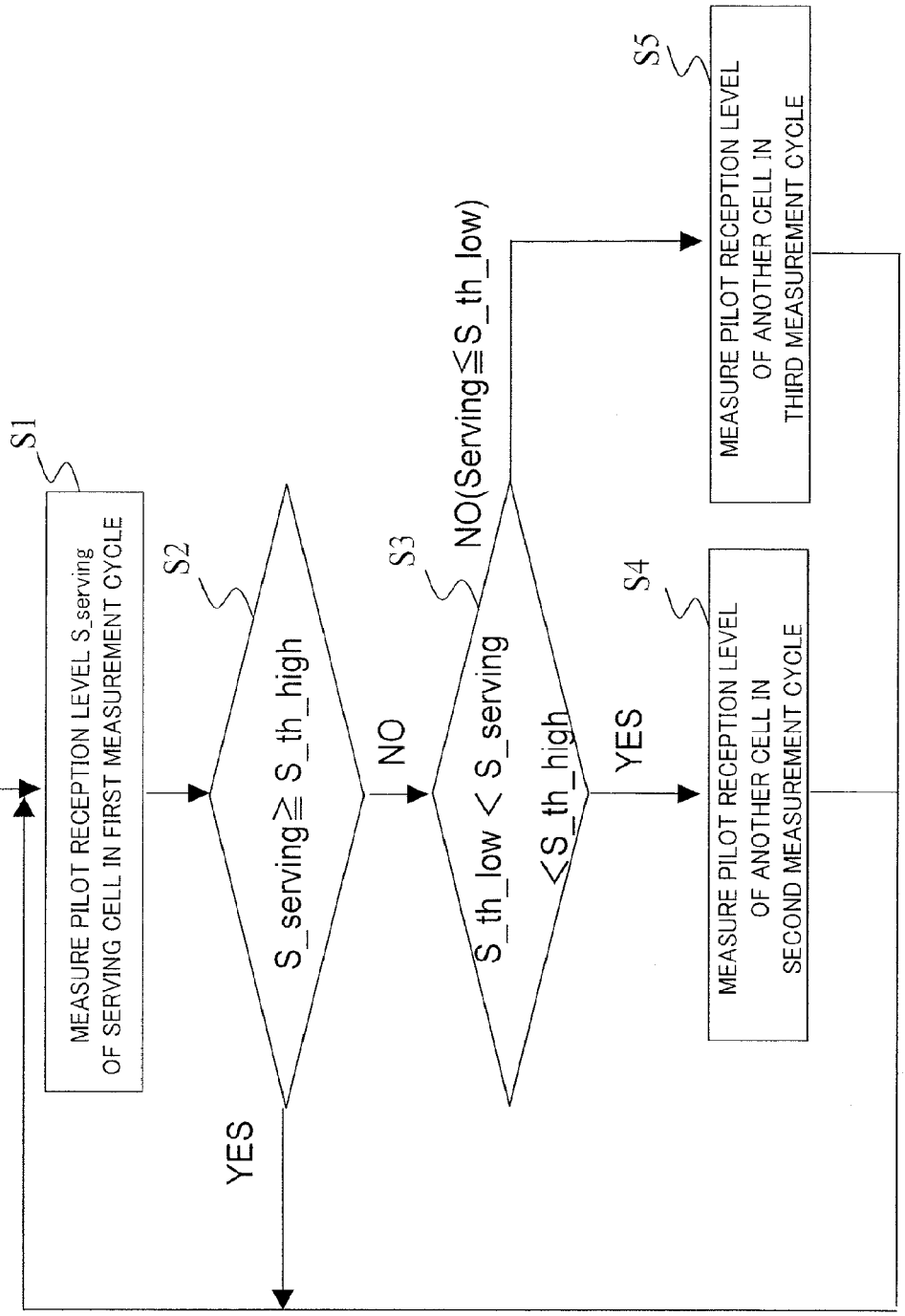
FIG. 6 is a flow chart illustrating another control according to the present invention.

In a first measurement cycle (1 second cycle, for example), the measurement control unit 37 of the mobile station measures a pilot reception level (S_serving) from the base station in a serving cell (which is also referred to as self-cell) in which the mobile station currently provides services (step S1 in FIG. 6). In this case, while not particularly limited, a self-cell measurement cycle management timer (not illustrated) may be prepared in the timer 37-2 of FIG. 4 of the mobile station. By setting a time-out value as the first measurement cycle (1 second, for example) and using occurrence of a time-out as a trigger, a measurement of the pilot reception level in the self-cell may be started and the measurement operation of the timer may be restarted.

The measurement control unit 37 of the mobile station compares the threshold S_serving with a threshold S_th_high of the threshold storage unit 37-1. When S_serving≥S_th_high (YES in step S2 in FIG. 6), as illustrated in FIG. 7, while the mobile station does not measure another cell, the mobile station measures the pilot reception level of the self-cell in the first measurement cycle (step S1 in FIG. 6). In this case, assuming that the threshold S_th_high and the threshold Q1 of FIG. 1 are matched, while the mobile station monitors the pilot signal reception level in the first measurement cycle, since the mobile station does not use the obtained results as measurement report data, the measurement result may be discarded.

Figure 7:
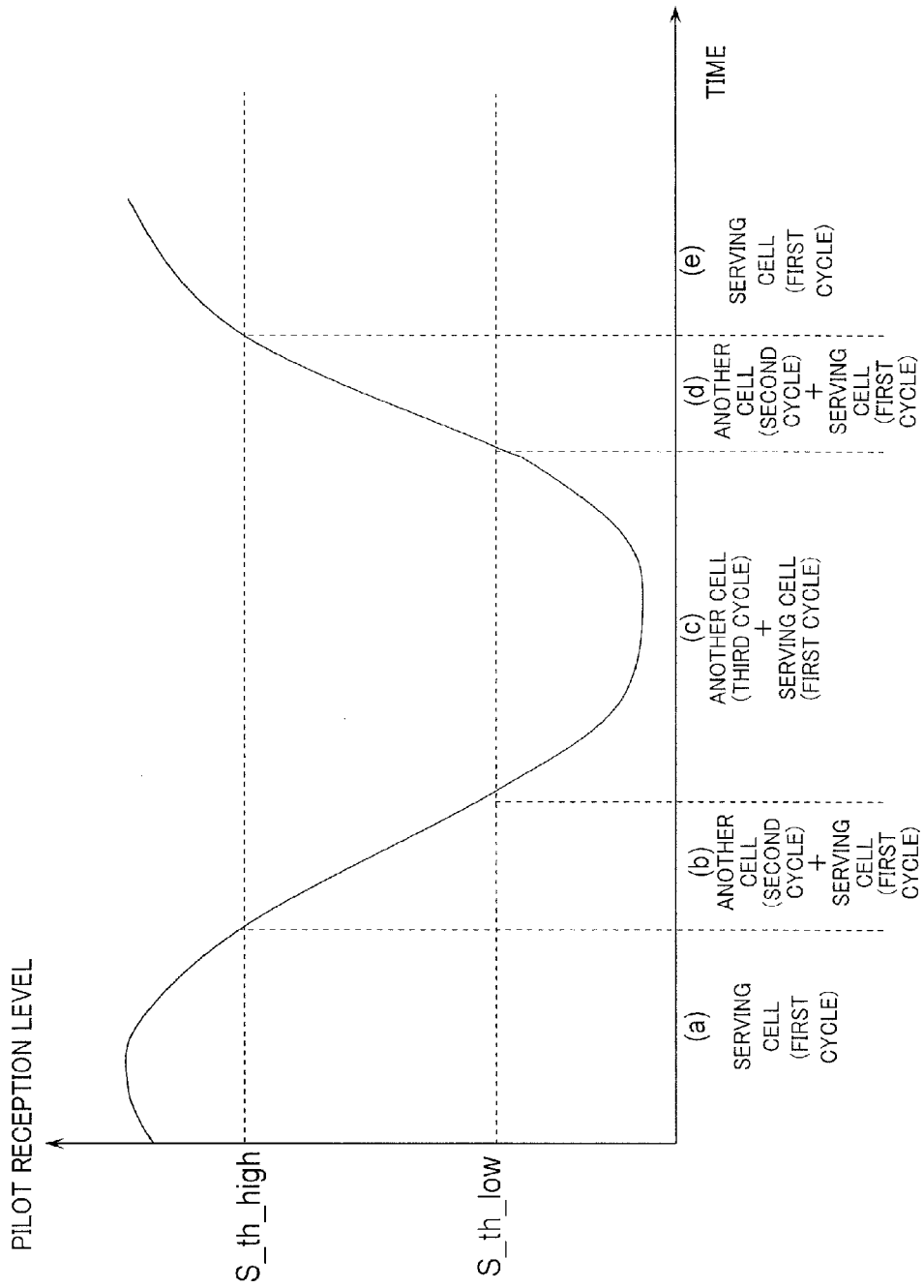
FIG. 7 is a diagram illustrating the control of FIG. 6.

Regarding a threshold S_th_low, which is smaller than the threshold S_th_high, when S_th_high<S_serving<S_th_high (YES in step S3), the measurement control unit 37 of the mobile station measures a pilot reception level (S_neighboring) of another cell (neighboring cell) in a second measurement cycle (5 second cycle, for example) (step S4 in FIG. 6), as illustrated in FIG. 7. Further, the measurement control unit 37 of the mobile station measures the pilot reception level of the self-cell in the first measurement cycle. Assuming that the threshold S_th_high and the threshold Q1 of FIG. 1 are matched, the measurement is set to be on, and the pilot signal reception level of another cell measured in the second measurement cycle and/or the pilot signal reception level of the self-cell measured in the first measurement cycle are stored in the measurement data storage unit 38 as measurement data to be reported. In this case, while not particularly limited, an another-cell measurement cycle management timer (not illustrated) may be prepared in the timer 37-2 of FIG. 4 of the mobile station. By setting a time-out value as the second measurement cycle (5 second, for example) and using occurrence of a time-out as a trigger, a measurement of the pilot reception level in another cell may be started and the measurement operation of the timer may be restarted.

When S_serving≤S_th_low, as illustrated in FIG. 7, the measurement control unit 37 of the mobile station measures the pilot reception level S_neighboring of another cell (neighboring cell) in a third measurement cycle (1 second cycle, for example) (step S5 in FIG. 6). In this case, the pilot reception level of the self-cell is measured in the first measurement cycle (step S1 of FIG. 6). In this case, the measurement is turned on, and the pilot signal reception level of another cell measured in the third measurement cycle and/or the pilot signal reception level of the self-cell measured in the first measurement cycle are stored in the measurement data storage unit 38 as measurement data to be reported. In this case, while not particularly limited, an another-cell measurement cycle management timer (not illustrated) may be prepared in the timer 37-2 of FIG. 4 of the mobile station. By setting a time-out value as the third measurement cycle (1 second, for example) and using occurrence of a time-out as a trigger, a measurement of the pilot reception level in another cell may be started and the measurement operation of the timer may be restarted.

Figure 8:
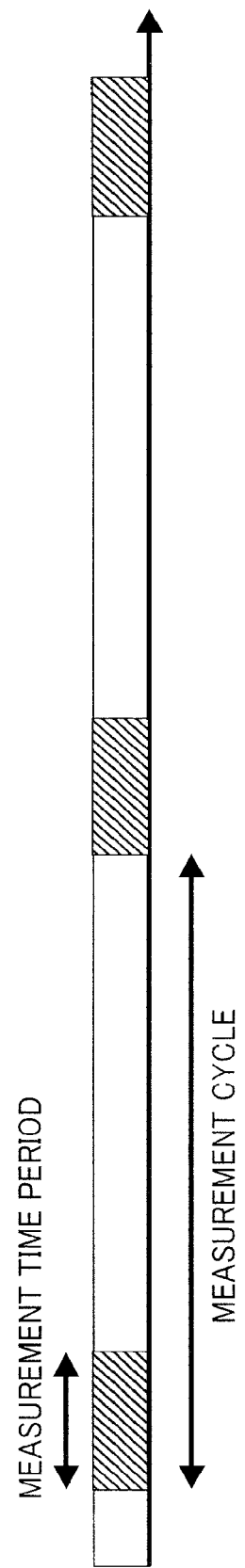
FIG. 8 is a diagram illustrating a measurement time period and a measurement cycle.

As illustrated in FIG. 8, each measurement is performed within a certain measurement time period (0.1 second, for example), and the measurement is not performed at other time periods. During the measurement, the measurement control unit 37 of the mobile station measures the received power of a common pilot signal transmitted from the base station to each cell. During the measurement time period of FIG. 8, the measurement may be performed in a certain sample cycle, and a mean value of all samples may be found.

According to the present exemplary embodiment, when the pilot reception level of the self-cell is high (YES in step S2 in FIG. 6), no measurement of another cell is performed. Thus, power consumed for the measurement can be reduced.

In addition, according to the present exemplary embodiment, when the pilot reception level is relatively high (YES in step S3 in FIG. 6), the measurement cycle of the pilot reception level of another cell is elongated (step S4 in FIG. 6). Thus, the power consumed for the measurement can be reduced to some extent. When the pilot reception level is lowered (NO in step S3 in FIG. 6), the measurement cycle of the pilot reception level of another cell is shortened.

Figure 9:
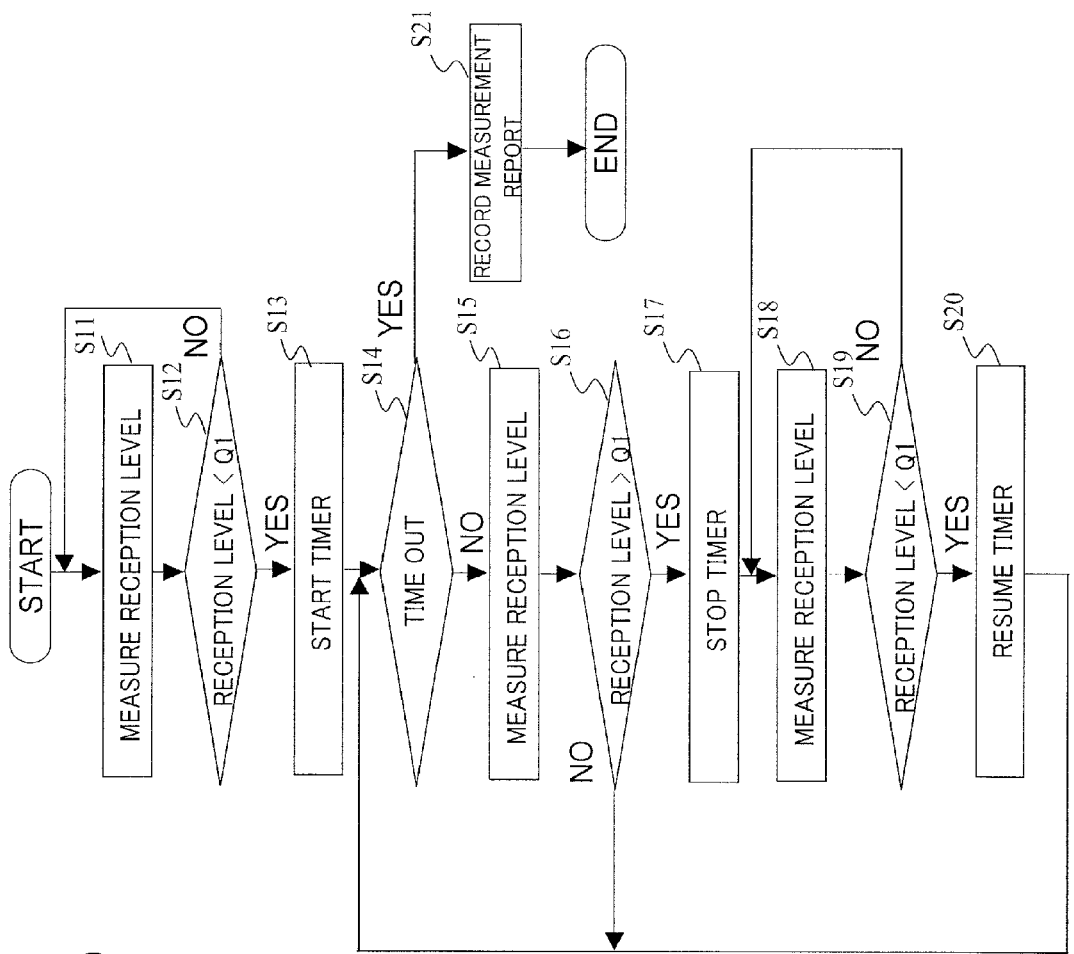
FIG. 9 is a flow chart illustrating another control according to the present invention.

Next, a third exemplary embodiment of the present invention will be described. FIG. 9 is a flow chart illustrating measurement control according to the third exemplary embodiment of the present invention. An operation of controlling link status measurement results and measurement reports about the results will be hereinafter described with reference to FIG. 9 and FIG. 4 that illustrates the configuration of the mobile station.

The measurement control unit 37 of the mobile station measures a pilot signal reception level (step S11), and when the pilot signal reception level is greater than or equal to a predetermined threshold Q1 of the threshold storage unit 37-1 (YES in step S12), a measurement report management timer (not illustrated) in the timer 37-2 is started (step S13), and the measurement is performed in the measurement cycle of FIG. 8 (the measurement cycle is shorter than a time-out period of the measurement report management timer).

Upon occurrence of a time-out of the measurement report management timer (not illustrated) (YES in step S14), the measurement data report control unit 39 is notified of the occurrence of a time-out by the timer 37-2, and based on measurement data in the report data storage unit 38, the report is recorded. The report is transmitted to the base station via the transmission data processing unit 33, the radio transmission/reception unit 31, and the antenna 30-1. As described above, the report includes the pilot signal reception quality of the self-cell and a neighboring cell(s), global positioning system (GPS) position information, TMSI, time information, and the like. When the measurement data report control unit 39 is notified of a radio link failure or the like by the link connection control unit 35, the report is not transmitted immediately but is stored in the report data storage unit 38. The report is transmitted to the base station later when a radio link is reestablished, for example.

After the timer is started in step S13 in FIG. 9, if a time-out does not occur, the pilot signal reception level is measured (step S15). If the reception level exceeds the threshold Q1 (YES in step S16), the timer is stopped (step S17).

After the timer is stopped, the pilot signal reception level is measured (step S18). If the reception level is less than the threshold Q1 (YES in step S19), the timer is resumed (restarted) (step S20). If the reception level is greater than or equal to the threshold Q1, the timer remains stopped, and the pilot signal reception level is periodically measured (NO in step S19). Based on this timer control, the measurement is performed and a report is recorded for the number of times corresponding to the number obtained by dividing the time-out period of the measurement report management timer by the measurement cycle.

Next, an exemplary embodiment where the present invention is applied to a self organizing/optimizing network (SON) including a SON server will be described. In the following exemplary embodiment, the monitoring result report in the above exemplary embodiments will be referred to as a SON measurement report (see Non-Patent Document 1).

Figure 10:
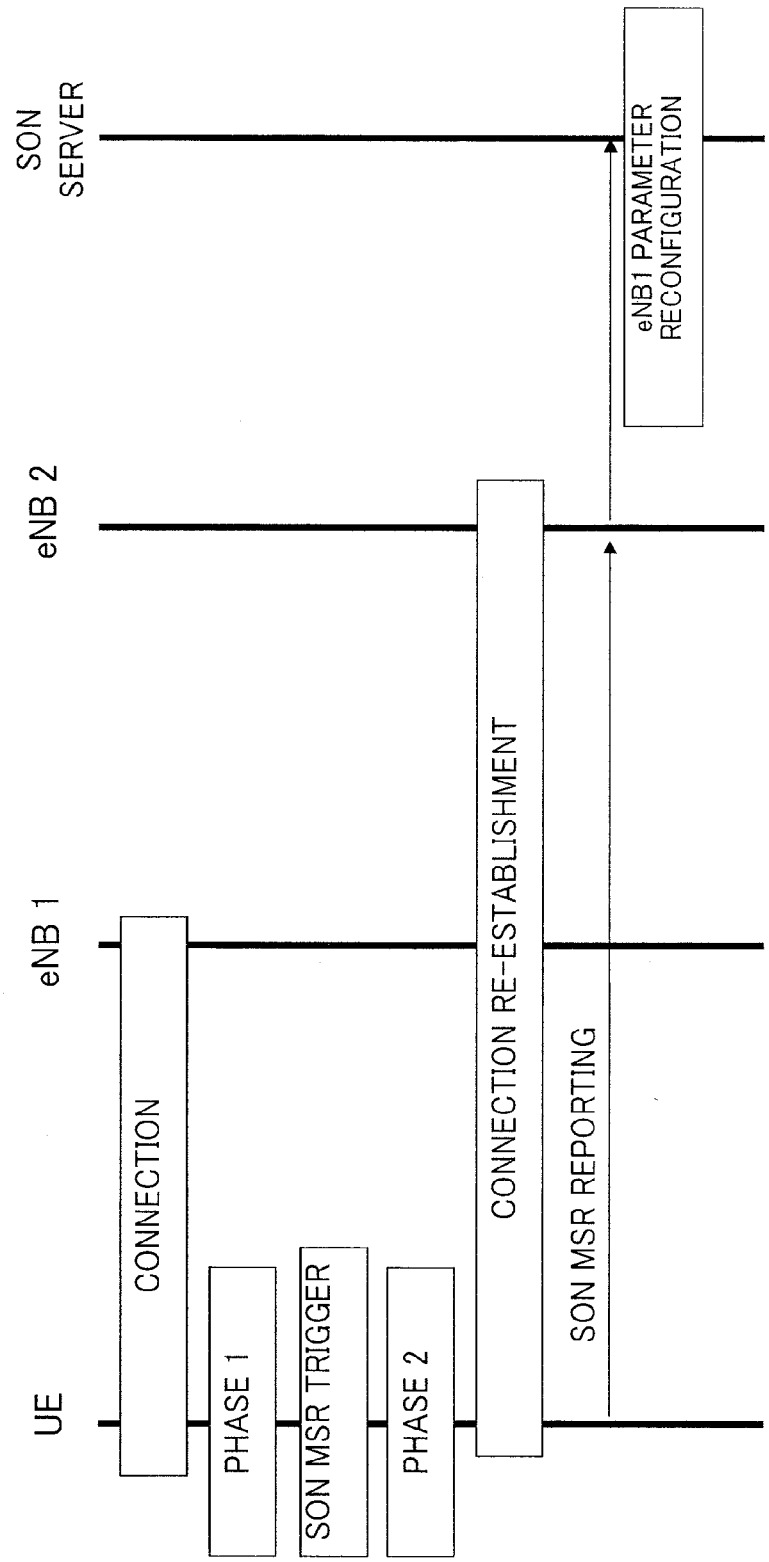
FIG. 10 is diagram showing a signal-flow of a SON measurement report.

As illustrated in FIG. 10, a mobile station (UE) is connected to a base station (eNB1) by radio, and when a radio link connection failure occurs, such failure is used as a trigger for the SON measurement report (SON Measurement (MSR) trigger). Phase 1 is a state in which the mobile station cannot identify the cell, and phase 2, which is after Phase 1, corresponds to the time during which the mobile station searches for another cell, instead of the current cell. When the mobile station reestablishes a link connection with a base station (eNB2) (connection re-establishment), the mobile station transmits a SON measurement report to the base station (eNB2). The SON measurement report is next transmitted from the base station (eNB2) to a management server (SON server). The management server (SON server) reconfigures, for example, radio parameters of the base station (eNB1) (eNB1 parameter reconfiguration).

Regarding such SON measurement report transmitted by the UE, power consumption (battery) of the UE is an issue. The SON measurement can also be derived from some measurements that have been obtained from other normal measurements such as measurements related to mobility or packet scheduling. Certain SON operations specific to the SON measurement would require more UE processing and hence incurs more power consumption. Also for the transmitting of a report of SON measurement result to the network (base station), resources of the network and UE side are used. When SON reports are transmitted via wireless access, the UE has to send the SON report in uplink and the network has to provide radio resources for the uplink transmission of the SON measurement. If there are only few SON-related uplink transmissions, it could be said that the impact of the overall SON related measurement to the uplink capacity would be marginal. However in order to optimize tens of thousands cells in the network, the required SON measurements would be rather significant assuming there should be a statistically sufficient samples for each cell in the network. Note that the SON measurements have to be performed on the previously optimized cell in order to make it sure the cell is always optimized state. This maintenance requirement implies that there would be permanent need for SON measurements during the life cycle of the network and therefore the radio capacity impact due to overall SON measurements could be significant.

There is one more overhead aspect related to the SON measurements with respect to the handling of reports at the management server (SON server) side. The management server can typically be assumed to be either fully automated system so that optimized cell parameters are driven from the SON measurements. Alternatively, the management server can be assumed to be a human based system in which an operator performs a manual tuning of cell parameters using the collected SON measurements.

In either case, if some of reported SON measurement results are less useful from the optimization point of view, those measurements have to be discarded by either manual operation or automatic filtering processing. In this sense, it is estransmittedial for SON measurement reporting to be configurable by the network in order to avoid the post-discarding processing of the SON measurement results.

In order to solve the above problems, the present inventors propose an invention that limits UE SON measurement by newly introducing a radio quality based reporting criteria.

As the criteria, the following qualities will be hereinafter described:
 a serving cell radio quality;
 a serving carrier radio quality;
 a serving radio access technology (RAT) radio quality (a serving RAT radio quality); and
 a serving MBSFN (a serving Multiple Single Frequency Network) radio quality (a serving carrier radio quality).

<Serving Cell Radio Quality>

Figure 11A:
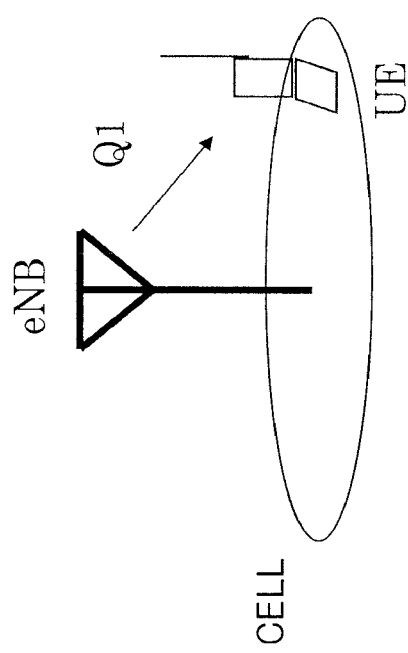
FIGS. 11A and 11B are diagrams illustrating activation/deactivation of a SON measurement based on radio quality.
Figure 11B:
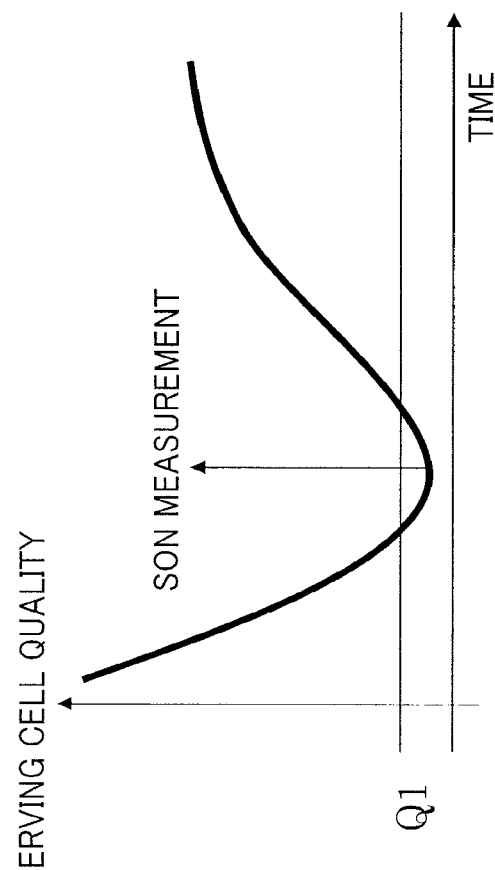

This criteria is to control UE of SON measurement if the current serving cell quality is lower/higher than a pre-defined level Q1 (see figure). FIGS. 11A and 11B illustrate on/off of the SON measurement based on the radio quality and correspond to the above-described FIG. 1. As illustrated in FIGS. 11A and 11B, this criteria allows to avoid UE in a good radio channel condition reporting the cell quality.

Note that one of purpose of SON measurements is to find the regions with poor radio quality so that the operator can control the cell parameters around the region to improve its radio quality. From this aspect, UE measurement of good radio quality would be mostly useless and both UE and network efforts on measuring good radio quality could not be paid off.

If the network wishes to disable completely the SON measurement, it can configure the Q1 to be negative infinite so that the serving quality is always greater than Q1.

If the network configures the Q1 as the minimum quality that can provide a suitable communication between eNB and UE, then UE will report the SON measurement, when it moves away from the serving cell. The following is a example of detail behavior using more detail mechanism for SON measurement and reporting.

Figure 12:
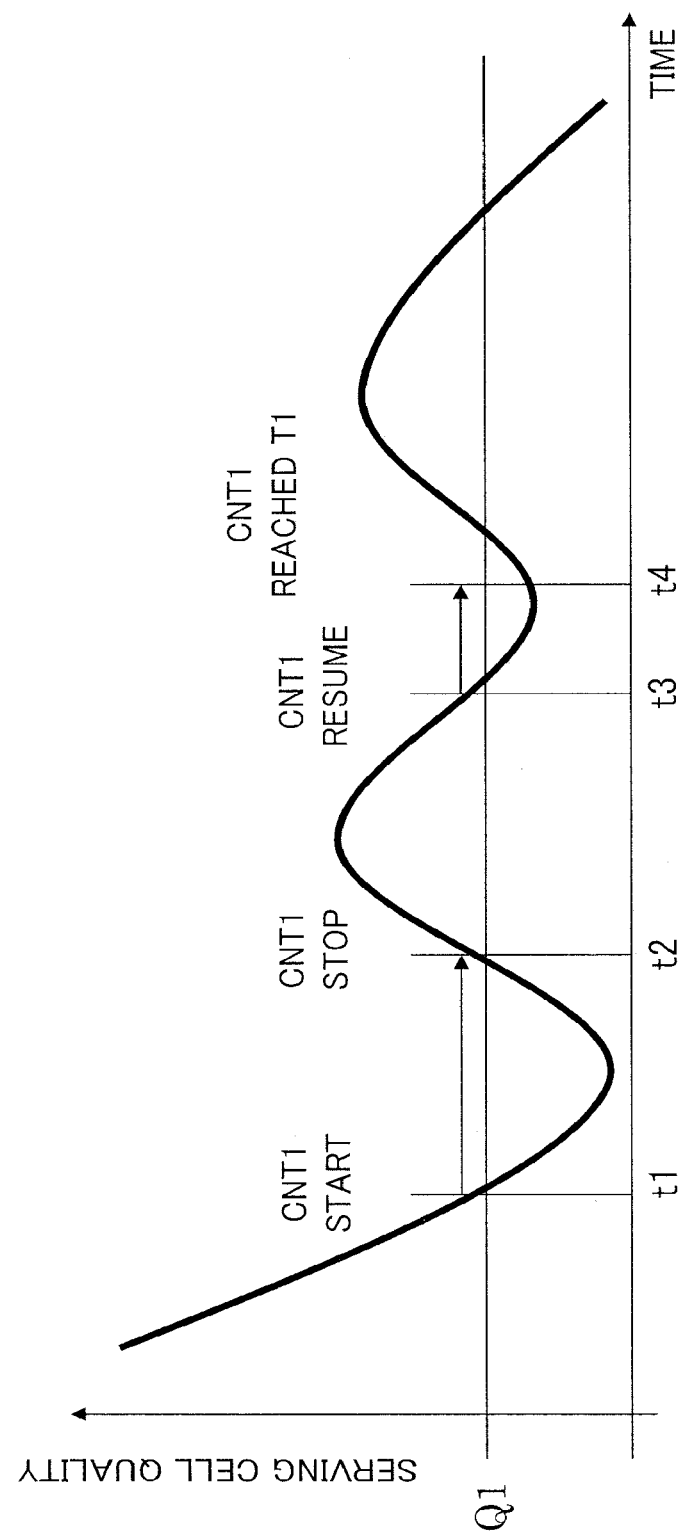
FIG. 12 is diagram illustrating a trigger of a SON measurement report based on radio quality.

FIG. 12 is a diagram illustrates SON measurement triggering based on radio quality. The horizontal axis represents time, and the vertical axis represents the radio quality of a serving cell (serving cell quality). FIG. 12 illustrates an example where the exemplary embodiment described with reference to FIG. 9 is applied to a SON measurement report. Referring to FIG. 12, when the serving cell quality drops below the pre-defined threshold Q1, at time (timing) t1, the count operation of a timer CNT1 (CNT1 corresponds to one of the timers in the timer 37-2 in FIG. 4) is started. A UE periodically checks the quality of another cell (neighboring cell) in a certain cycle (every 100 msec or every 1000 msec, for example).

When the serving cell quality improves and exceeds the threshold Q1 at timing t2, the UE stops the count operation of the timer CNT1. The quality check of another cell (neighboring cell) is also stopped.

When the serving cell quality degrades at timing t3, the time measurement operation by the timer CNT1 is resumed. The quality check of another cell (neighboring cell) is also resumed.

When the timer CNT1 reaches a pre-defined threshold T1 (occurrence of a time-out) at timing t4, the SON measurement report is recorded.

The proposed mechanism is based on the simple start-resume-stop counter operation based on the comparison of serving cell quality and the pre-defined threshold Q1.

This counter operation allows SON measurement to be triggered only when there is a persistent problem of serving cell quality, i.e. the persistency is controlled by the timer length T1.

For example, this counter CNT1 can be set as few minutes in order to avoid SON measurement reporting for the case of short duration of serving cell quality degradation. One practical example can be the scenario in which a user enters an elevator and come back a minute later. In this case, the timer does not time out and SON measurement is not carried out. While the timer CNT1 is running, UE can perform the neighbor cell measurement for SON measurement report.

Figure 13:
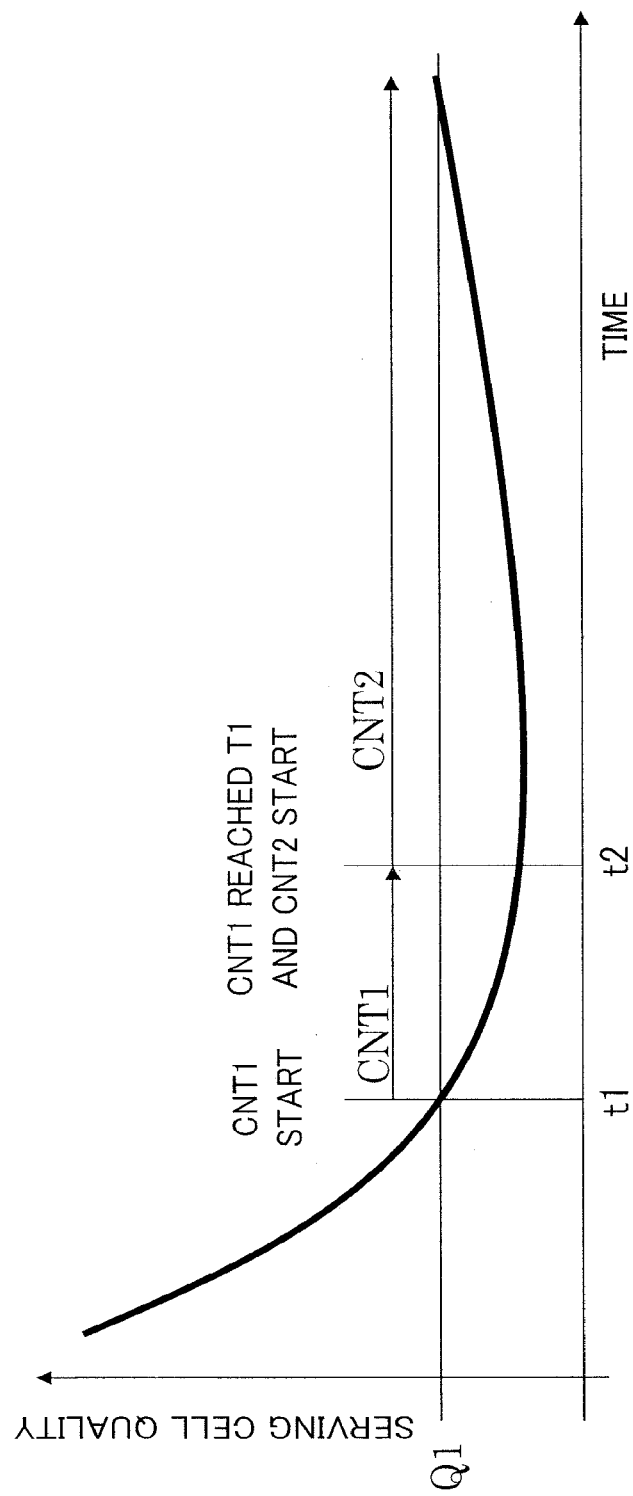
FIG. 13 is diagram illustrating prohibition of a SON measurement.

As another example, the present invention includes a mechanism that prohibits the UE from repeating SON measurement reports when reporting is triggered. FIG. 13 is a diagram illustrating a SON measurement prohibition mechanism.

At timing t1, the serving cell quality falls below the predetermined threshold Q1, and the timer CNT1 is started. After timing t1, the UE periodically checks the quality of a neighbor cell.

At timing t2, the timer CNT1 reaches a pre-defined time-out period (threshold) T1, and the SON measurement report is recorded. At timing t2, a prohibition timer CNT2 is started. When the timer CNT2 is running, the UE does not perform SON-related processing.

For example, if a time-out period of the timer CNT2 can be set as one day. After a time-out of the timer CNT1, the UE does not perform SON-related processes for one day, so allowing UE to perform at maximum one SON measurement per one day.

In FIG. 12, it would be needed to re-start the timer CNT1 if the duration between t2 and t3 exceeds a certain level in order to avoid UE to keep accumulating the short and temporal serving cell quality degradation.

When UE is reconnected to the serving cell during CNT1 is on-hold, CNT1 should be reset.

Figure 14:
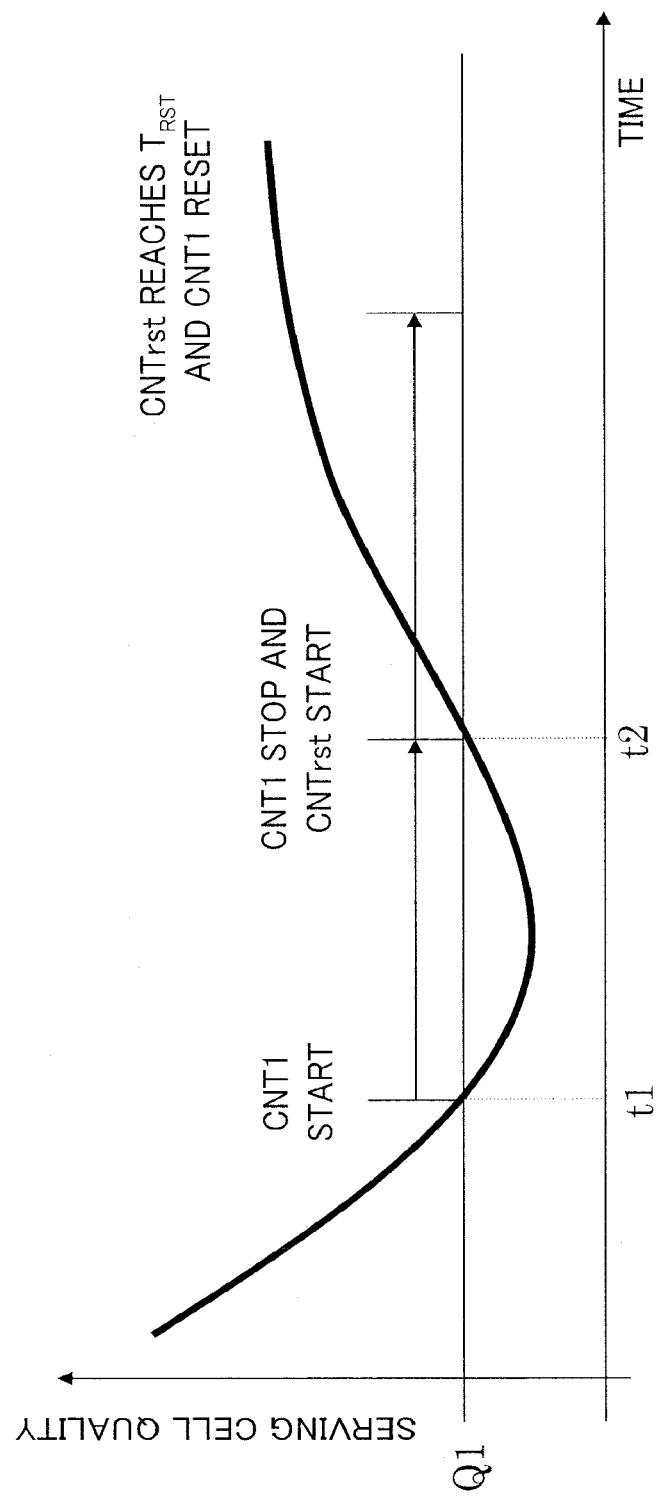
FIG. 14 is diagram illustrating a SON measurement in the case of a short-period failure.

FIG. 14 illustrates the SON measurement in the case of a short-term failure. At timing t1, the serving cell quality falls below the pre-defined threshold Q1, and the timer CNT1 is started. At timing 2, the serving cell quality becomes greater than or equal to the threshold Q1, the timer CNT1 is stopped, and a reset timer CNTrst is started. In this state, when the timer CNTrst times out, the timer CNT1 is reset.

Next, handover procedure and the SON measurement will be described. When the serving cell quality degrades, while UE is in an active call session, the UE tries to find another cell for handover. The handover measurement procedure allows UE to report a presence of target cell so that current cell can prepare the handover procedure.

In this normal handover case, although the serving cell quality (the reception quality of a pilot signal of a serving cell) degrades below Q1, UE should not start the SON measurement. This can be possible by a suitable setting of the threshold Q1 and the time-out period T1 of the timer CNT1 that the normal handover interruption does not cause the SON measurement. Either the threshold Q1 can be configured lower than the handover triggering quality level or the time-out period T1 of the timer CNT1 can be set longer enough than a time period for handover (from a handover request to a handover completion, for example). Alternatively, in UE, the threshold Q1 related processing can be cancelled during active mode handover procedure (from a handover request to a handover completion, for example).

Figure 15:
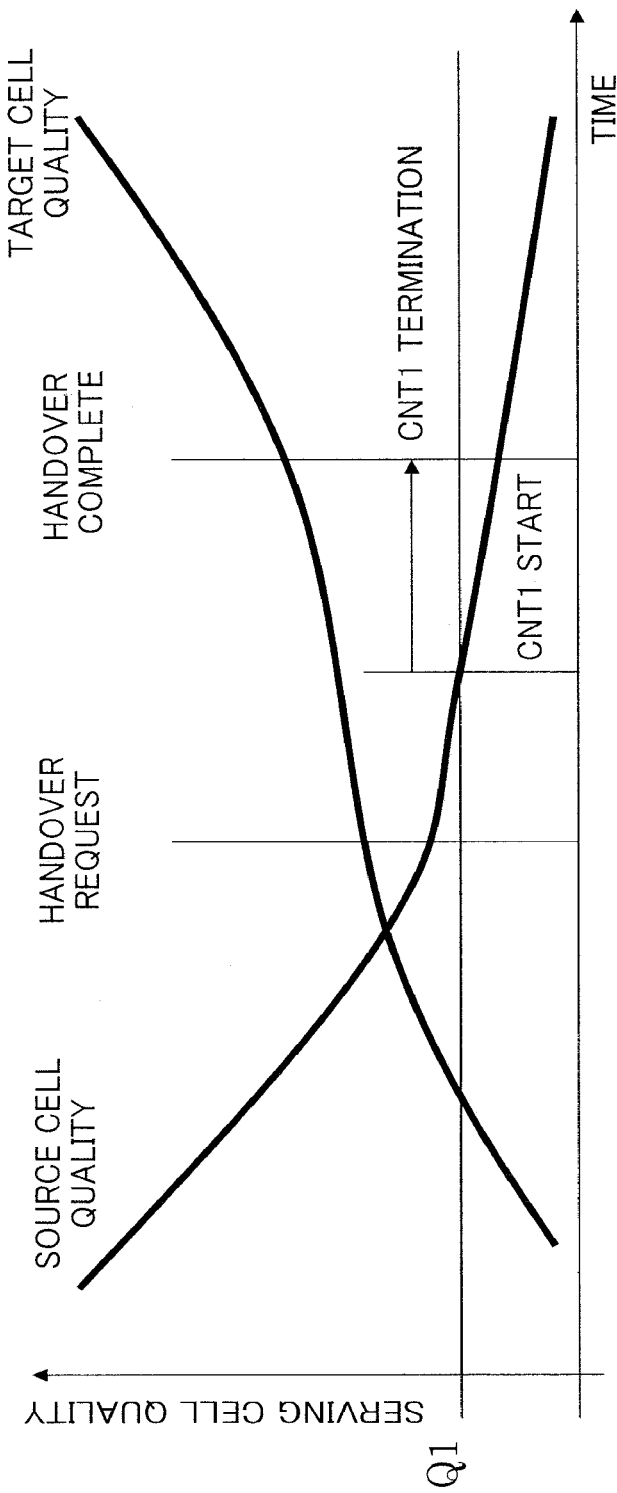
FIG. 15 is diagram illustrating a SON measurement in the case of a handover.

FIG. 15 is a diagram illustrating a relationship between the cell quality and the timer during a handover. In an example illustrated in FIG. 15, after a handover request, the mobile station detects that the quality of the handover source cell (source cell quality) degrades, and the quality of a handover target cell (target cell quality) improves. When the source cell quality falls below the threshold Q1, the timer CNT1 is started, and the measurement would be periodically performed. However, such measurement of the source cell quality would be ineffective. Thus, in the example illustrated in FIG. 15, when a handover is completed (handover complete), the measurement by the timer CNT1 is stopped.

<Cell Reselection in Idle Mode>

When the UE moves from cell to cell in an idle mode, the mobility is conducted based on UE decision, i.e. radio quality based best cell reselection. The threshold Q1 can be defined for the camped cell and activation/deactivation can be executed similar to the active mode UE. Also during cell-reselection period, unnecessary SON measurement can be avoided by appropriate setting of Q1 and CNT1.

The setting of Q1 and CNT1 can be UE's mode dependent so that the network can configure Idle mode not to spend more battery power than active UE since idle UE should be allowed less SON related processing for longer stand-by time. This is because the UE in an idle mode performs less SON-related processing during a longer standby time. Alternatively, during a handover procedure period in an idle mode, procedures (processing) relating to the threshold Q1 may be canceled.

<UE Locating in Network Border>

Figure 16:
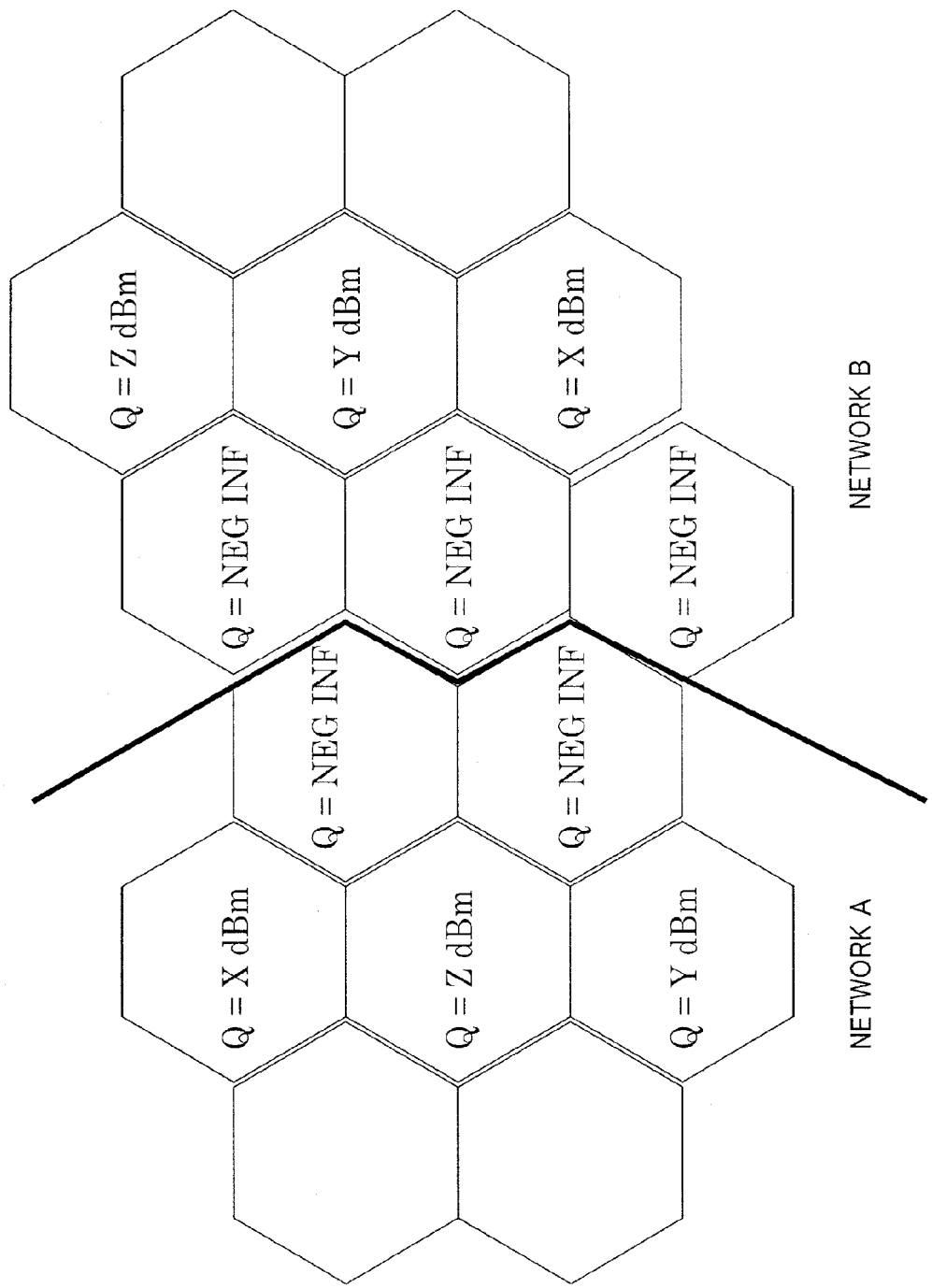
FIG. 16 is diagram illustrating a SON measurement at a network border.

For the case when UE stays at the border of network, such as country border, it may be possible that UE reports the SON measurement at network border. However, by setting the reception quality threshold Q1 to be negative infinity or the like and allowing the mobile station to switch off SON measurements in a cell at the network border, the UE can be prohibited from reporting a SON measurement at the network border. In an example illustrated in FIG. 16, in cells at the boundary between networks A and B, a reception quality threshold Q is set to be negative infinity, and therefore, the SON measurement is not performed in these cells at the boundary. Needless to say, the shape of a cell is not limited to a regular hexagon. In each of the cells other than the cells at the boundary between the networks A and B, a value different from the negative infinity is set as the threshold Q (X, Y, or ZdBm, for example), and when the reception quality falls below the threshold Q, the mobile station visiting one of these cells switches on the SON measurement.

<Serving Carrier/RAT Radio Quality>

In the case of multi-carriers/RAT (radio access technology), UE can be connected in one of the carrier/RAT to be able to connect to the network of patchy coverage provided by one or more carrier/RAT. The solution can be also extended straightforward fashion that each carrier/RAT to indicate the necessary control parameters such as the threshold Q1 and the time-out period T1. This parameter can be configured per carrier/RAT specific since the necessary condition of quality level Q1 can be carrier/RAT specific.

Figure 17:
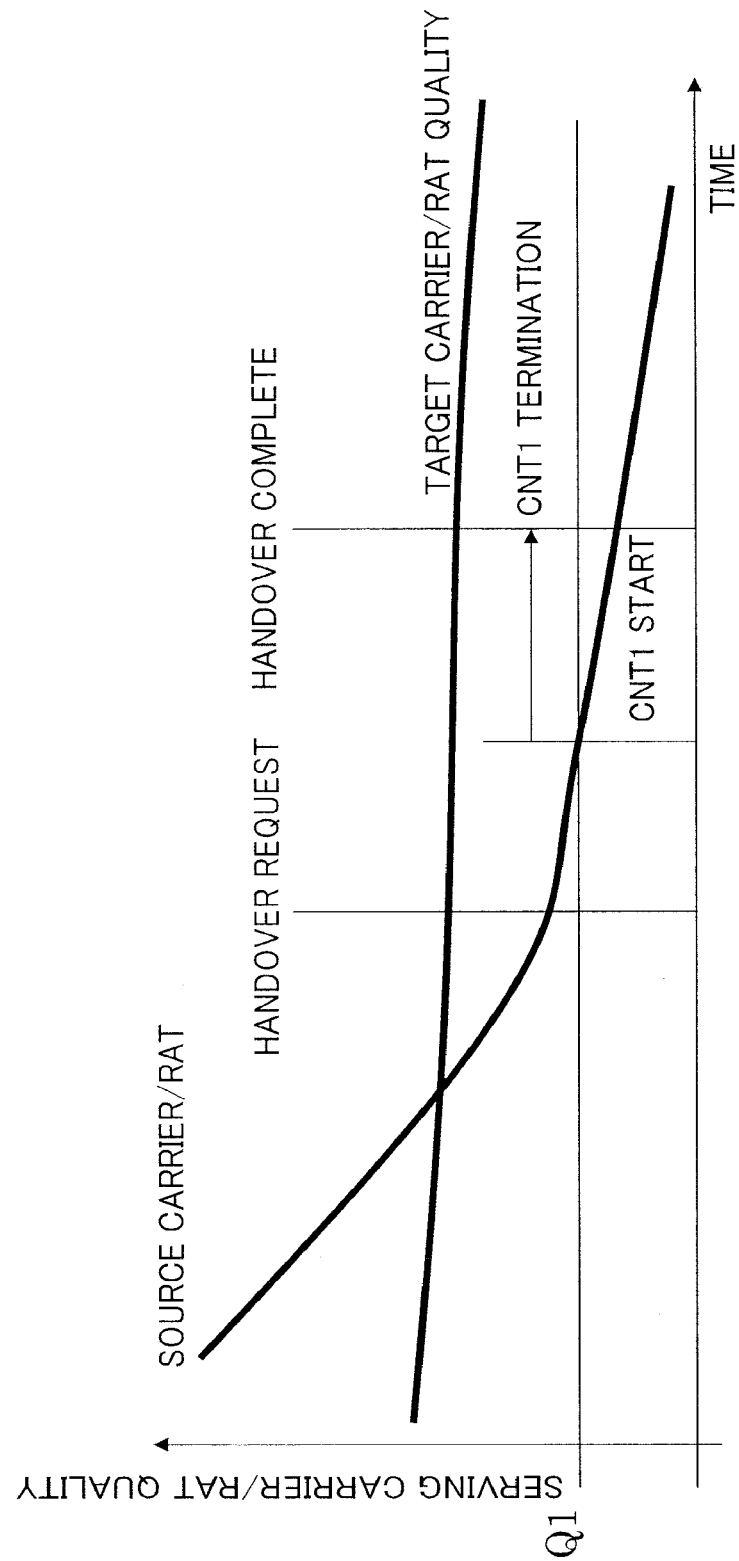
FIG. 17 is diagram illustrating a SON measurement in the case of a handover between carriers/RANs.

FIG. 17 is a diagram illustrating an inter-carrier/RAT handover from one carrier/RAT to another carrier/RAT, and a SON measurement. When the quality of one carrier/RAT (source carrier/RAT) degrades, the connection is switched to another carrier/RAT (target carrier/RAT). Namely, when the quality falls below the threshold Q1, the timer CNT1 is started, and the measurement is performed in a predetermined cycle. However, upon completion of a handover to another carrier/RAT (target carrier/RAT) (handover complete), the time measurement operation of the timer CNT1 is stopped.

By stopping the measurement operation of the timer CNT1, the UE is prohibited from performing a SON measurement of the handover source carrier/RAT whose reception quality has fallen below the threshold Q1, until the timer times out. Alternatively, during a procedure for an inter-carrier/RAT handover, procedures (processing) relating to the threshold Q1 are cancelled.

<Serving MBSFN Radio Quality>

Serving MBSFN (Multicast Broadcast Single Frequency Network) area is a set of cells transmitting the same content so that UE can receive the same content (television program) from more than one cell at a time.

SON measurement can be also useful in the MBSFN transmission in order to find the MBSFN coverage problem in the network.

For this type of MBSFN communication, the quality criteria Q1 and CNT1 should be defined not to an individual cell level but to a set of cells transmitting the same content.

In other words, the total reception quality from all cells contributing to the MBSFN transmission would be used instead of the reception quality from the cell which UE is camped or connected for unicast service.

Also when defining the MBSFN reception quality, there could be at least two candidates such as received pilot quality of MCCH (MBMS (Multimedia Broadcast and Multicast Service) Control CHannel) channel and received pilot quality of MTCH (MBMS Transfer Channel).

The MCCH and MTCH carry, respectively, the control and data information of MBSFN transmission. UE should receive both MCCH and MTCH in order to receive MBSFN transmission (possibly MCCH first and then MTCH). MCCH can contain control information for more than one MTCH and its MBSFN area could be wider or narrower than that of MTCH.

The MBSFN reception quality can be defined either for MCCH or MTCH depending on which channel operator has interest to optimize using SON measurement reporting. However, in many cases, both MCCH and MTCH would have identical MBSFN area and therefore in the following description we do not differentiate the reception quality of MCCH and MTCH.

Figure 18:
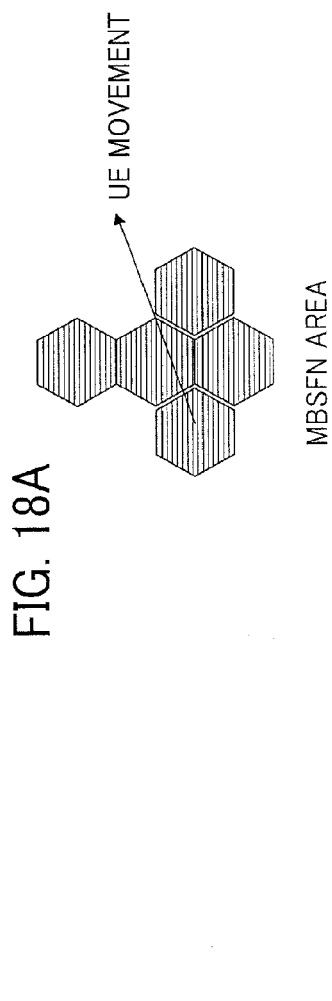
FIGS. 18A and 18B are diagrams illustrating a SON measurement when a user equipment moves in an MBSFN network area.

FIGS. 18A and 18B illustrate a scenario of MBSFN transmission with 5 cells transmitting the same contents to UE. UE is moving around the network so that it started MBSFN reception in the middle of MBSFN area and then it moves away from the MBSFN area. The time variation of MBSFN reception quality is shown with a detail example MBSFN SON measurement procedure.

Referring to FIG. 18B, when the MBSFN reception quality falls below the pre-defined threshold Q1 at timing t1, the timer CNT1 is started, and the UE periodically checks the MBSFN quality.

When the timer CNT1 reaches the pre-defined time-out period (threshold) T1 at timing t2, a SON measurement report is recorded. Subsequently, the prohibition timer CNT2 is started. From timing t2 on, UE is no longer needed to check the MBSFN quality for the SON measurement purpose.

When the timer CNT2 reaches a pre-defined time-out period (threshold) T2 at timing t3, UE is now no longer prohibited for new SON measurement. UE checked the serving MBSFN quality and found out its quality is below the Q1 and hence starts the timer CNT1.

At timing t4, similar to the situation at t2, the timer CNT1 reached the pre-defined threshold T1 and a SON measurement is triggered/recorded. After that, the prohibition timer CNT2 is started. From timing t4 on, UE is not necessarily required to check MBSFN quality for SON measurement purpose.

At timing t5, similar to the situation at t3, the CNT2 is now reached to the pre-defined threshold T2. UE is now no longer prohibited for new SON measurement. UE checked the serving MBSFN quality and found out its quality is below the threshold Q2 and hence starts the timer CNT3.

At timing t6, t6; the timer CNT3 now reaches the pre-defined threshold T3. UE is considered to be outside of MBSFN area. Therefore SON measurement is not required and the timer CNT2 is now started, While not particularly limited, the time-out periods T1 and T3 of the timers CNT1 and CNT3 are in the order of few seconds, and the time-out period T2 of the timer CNT2 is in the order of minutes or hours.

The SON-measurement related parameters T1, T2, T3, Q1, and Q2 can be transmitted via MCCH as part of control information for the corresponding MTCH transmission.

Figure 19:
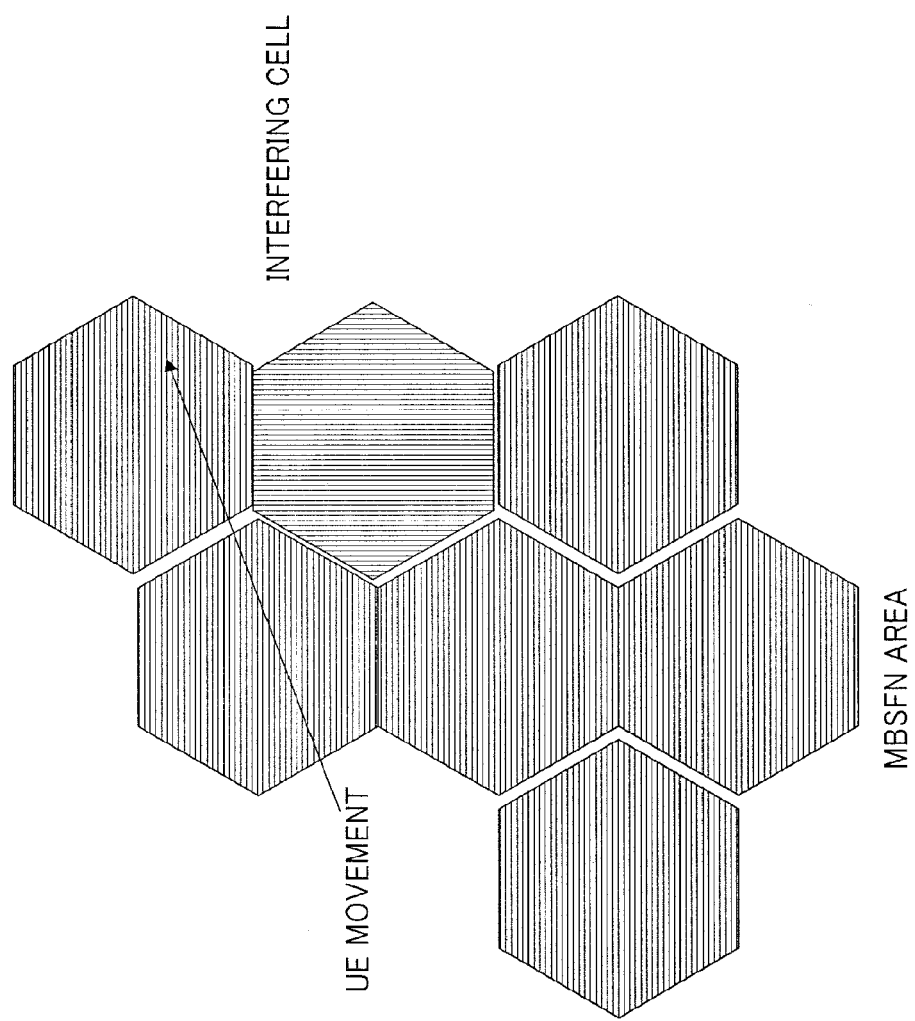
FIG. 19 is diagram illustrating an interfering cell and a user equipment moving in an MBSFN network area.

Furthermore, when the serving MBSFN quality drops below the threshold Q1, the network can configure UE to measure the interference from neighbor cells. FIG. 19 schematically illustrates a scenario where UE is passing through an MBSFN area, and there is one cell that transmits non-MBSFN data on the same frequency-time resources and hence interfering MBSFN reception of the UE. When UE moves closer to the interference cell, the serving MBSFN quality will degrade. Then, UE can start the neighbor cell measurement in order to find which cell is contributing to the interference on this MBSFN transmission. Once the UE finds out the interference cell, the UE could sends the ID of the interference cell to the network as part of the SON measurement report.

As described in the above exemplary embodiments, the following configurations are provided.

[1] According to one exemplary embodiment, there is provided a mobile terminal that determines, in accordance with reception quality of a radio signal from a base station, a measurement cycle of a predetermined measurement on a link status performed by the mobile terminal and/or on and off of the predetermined measurement and that controls execution of the predetermined measurement based on the determination.

[2] In the mobile terminal according to the above [1], the predetermined measurement includes a measurement necessary to create a measurement report on a link status to be transmitted to a base station from the mobile terminal.

[3] In the mobile terminal according to the above [1] or [2], when reception quality of a pilot signal from the base station exceeds a predetermined threshold, the mobile terminal switches off the predetermined measurement, and when the reception quality is less than or equal to the predetermined threshold, the mobile terminal switches on the predetermined measurement.

[4] In the mobile terminal according to any one of the above [1] to [3], the mobile terminal measures reception quality of a pilot signal from a base station in a single cell in a first measurement cycle, and if, as a result of the measurement, the pilot signal reception quality falls below a predetermined first threshold and exceeds a predetermined second threshold, the mobile terminal measures reception quality of a pilot signal from a base station in another cell in a second measurement cycle.

[5] In the mobile terminal according to the above [4], in case, as a result of the measurement of the reception quality of the pilot signal from the base station in the single cell, the reception quality of the pilot signal from the base station in the single cell is less than or equal to the second threshold, the mobile terminal measures reception quality of a pilot signal from a base station in another cell in a third measurement cycle, and in case the reception quality of the pilot signal from the base station in the single cell is greater than or equal to the first threshold, the mobile terminal does not measure reception quality of a pilot signal from a base station in another cell.

[6] In the mobile terminal according to any one of the above [1] to [3], when reception quality of a pilot signal from a base station is less than or equal to a predetermined threshold, the mobile terminal starts a measurement report management timer arranged therein, when the pilot signal reception quality exceeds the predetermined threshold, the mobile terminal stops the measurement operation of the timer as long as the pilot signal reception quality is above the predetermined threshold, when the pilot signal reception quality falls below the predetermined threshold, the mobile terminal resumes the measurement operation of the timer, and when a time-out of the timer occurs, the mobile terminal records a report on the predetermined measurement.

[7] In the mobile terminal according to any one of the above [1] to [3], when reception quality of a pilot signal from the base station is less than or equal to a predetermined threshold, the mobile terminal starts a first timer arranged therein and used to manage measurement reports, and when the pilot signal reception quality is below a predetermined threshold and a time-out of the first timer occurs, the mobile terminal records a report on the predetermined measurement, starts a second timer arranged therein, and prohibits execution of the predetermined measurement during the measurement operation of the second timer.

[8] In the mobile terminal according to any one of the above [1] to [3], when reception quality of a pilot signal from the base station is less than or equal to a predetermined threshold, the mobile terminal starts a first timer arranged therein and used to manage measurement reports, and when reception quality of the pilot signal exceeds a predetermined threshold, the mobile terminal stops the first timer, starts a second timer for resetting, and resets the first timer when a time-out of the second timer occurs.

[9] According to an exemplary embodiment of the present invention, there is provided a mobile terminal characterized in that compare radio quality of a cell with a predetermined threshold and control a measurement on a link status performed by the mobile terminal based on whether the radio quality of the cell is higher or lower than the threshold.

[10] In the mobile terminal according to any one of the above [1] to [9], when radio quality of a single cell becomes less than or equal to a predetermined threshold, the mobile terminal starts a timer arranged therein and periodically measures radio quality of a cell neighboring to the single cell, when radio quality of the single cell exceeds the predetermined threshold, as long as the radio quality of the single cell is above the predetermined threshold, the mobile terminal stops the measurement operation of the timer and the periodic measurement of the radio quality of the neighbor cell, when radio quality of the single cell becomes less than or equal to the predetermined threshold, the mobile terminal resumes the measurement operation of the timer, and when a time-out of the timer occurs, the mobile terminal records a measurement report.

[11] In the mobile terminal according to any one of the above [1] to [9], when radio quality of a single cell becomes less than or equal to a predetermined threshold, the mobile terminal starts a first timer arranged therein and periodically measures radio quality of a cell neighboring to the single cell, and when radio quality of the single cell is less than or equal to the predetermined threshold and a time-out of the first timer occurs, the mobile terminal records a report about the measurement, starts a second timer arranged therein, and prohibits the measurement during the measurement operation of the second timer.

[12] In the mobile terminal according to any one of the above [1] to [9], when radio quality of a single cell becomes less than or equal to a predetermined threshold, the mobile terminal starts a first timer arranged therein and periodically measures radio quality of a cell neighboring to the single cell, when radio quality of the single cell exceeds the predetermined threshold, the mobile terminal stops the first timer and starts a second timer arranged therein, and when the second timer times out while the first timer is stopped and the radio quality is above a predetermined threshold, the mobile terminal resets the first timer.

[13] In the mobile terminal according to any one of the above [1] to [9], when radio quality of a handover source cell becomes less than or equal to a predetermined threshold during a handover, the mobile terminal starts a measurement report management timer arranged therein, and upon completion of the handover, the mobile terminal stops the timer.

[14] In the mobile terminal according to the above [9], the mobile terminal sets the threshold to be a predetermined value so that radio quality of a cell is always above the threshold, and when radio quality of a handover source cell becomes less than or equal to a predetermined threshold during a handover, the mobile terminal does not start a timer arranged therein and used to manage the time relating to a measurement report or the mobile terminal sets a time-out period of the timer to be longer than the time required for the handover.

[15] In the mobile terminal according to the above [9], the mobile terminal cancels processing relating to the threshold during a handover in an active mode or an idle mode.

[16] In the mobile terminal according to the above [9], the mobile terminal sets the threshold to be a predetermined value in a cell at a network border, and when radio quality of the cell exceeds the threshold, the mobile terminal prohibits the measurement in the cell at the network border.

[17] In the mobile terminal according to the above [9], the mobile terminal is connected to a plurality of carriers/RATs (Radio Access Technologies), and sets, for each of the carriers/RATs, the threshold or a time-out period of a timer that is arranged in the mobile terminal and that is used to manage the time relating to a measurement report.

[18] In the mobile terminal according to the above [17], parameters of the timer are set in consideration of the time required for an inter-carrier/RAT handover from one carrier/RAT to another carrier/RAT.

[19] In the mobile terminal according to the above [17], during an inter-carrier/RAT handover from one carrier/RAT to another carrier/RAT, the mobile terminal cancels processing relating to the threshold.

[20] In the mobile terminal according to the above [9], when reception quality of an MBSFN (Multicast Broadcast Single Frequency Network) is less than or equal to a predetermined first threshold, the mobile terminal starts a first timer arranged therein and used to manage measurement reports and periodically measures reception quality of the MBSFN, when a time-out of the first timer occurs, the mobile terminal records a measurement report and starts a second timer arranged therein and used to manage measurement prohibition, and when a time-out of the second timer occurs, the mobile terminal starts the first timer and periodically measures reception quality of the MBSFN.

[21] In the mobile terminal according to the above [20], at the time of a time-out of the first timer, which is started when a time-out of the second timer occurs, the mobile terminal records a report about the measurement and starts the second timer, when a time-out of the second timer occurs, the mobile terminal starts a third timer arranged therein and periodically measures reception quality of the MBSFN based on the third timer, and when reception quality of the MBSFN is below a predetermined second threshold and a time-out of the third timer occurs, the mobile terminal starts the second timer.

[22] In the mobile terminal according to the above [21], when a time-out of the first to third timers occurs, the first and second thresholds are transmitted to the mobile terminal via MCCH as part of control information for corresponding MCCH (MBMS (Multimedia Broadcast/Multicast Service) Control CHannel) transmission.

[23] In the mobile terminal according to the above [9], when reception quality of an MBSFN (Multicast Broadcast Single Frequency Network) falls below a predetermined threshold, the mobile terminal measures another cell.

[24] According to an exemplary embodiment of the present invention, there is provided a radio communication system including a base station and the mobile terminal according to any one of the above [1] to [23].

[25] According to an exemplary embodiment of the present invention, there is provided a base station that provides a mobile terminal, which determines, in accordance with reception quality of a pilot signal from a base station, a measurement cycle of a predetermined measurement on a link status and/or on/off of the measurement and control execution of the predetermined measurement based on the determination, with the pilot signal and that receive a report on the predetermined measurement from the mobile terminal.

[26] According to another exemplary embodiment of the present invention, there is provided a management server that receives, from a mobile terminal, which determines, in accordance with reception quality of a pilot signal from a base station, a measurement cycle of a predetermined measurement on a link status and/or on/off of the measurement and controls execution of the predetermined measurement based on the determination, a report about link status measurement results transmitted via the base station and optimize radio parameters based on the measurement report.

[27] According to an exemplary embodiment of the present invention, there is provided a radio communication method in which a mobile terminal determines, in accordance with reception quality of a radio signal from a base station, a measurement cycle of a predetermined measurement on a link status and/or on/off of the predetermined measurement and controls execution of the predetermined measurement based on the determination.

[28] According to another exemplary embodiment of the present invention, there is provided a radio communication method in which a mobile terminal compares radio quality of a cell with a predetermined threshold and controls a measurement on a link status performed by the mobile terminal based on whether the radio quality of the cell is higher or lower than the threshold.

[29] In the radio communication method according to the above [27] or [28], when radio quality of a single cell becomes less than or equal to a predetermined threshold, the mobile terminal starts a timer arranged therein and periodically measures radio quality of a cell neighboring to the single cell, when radio quality of the single cell exceeds the predetermined threshold, as long as the radio quality of the single cell is above the predetermined threshold, the mobile terminal stops the measurement operation of the timer and the periodic measurement of the radio quality of the neighbor cell, when radio quality of the single cell becomes less than or equal to the predetermined threshold, the mobile terminal resumes the measurement operation of the timer, and when a time-out of the timer occurs, the mobile terminal records a measurement report.

[30] In the radio communication method according to the above [27] or [28], when radio quality of a single cell becomes less than or equal to a predetermined threshold, the mobile terminal starts a first timer arranged therein and periodically measures radio quality of a cell neighboring to the single cell, and when radio quality of the single cell is less than or equal to the predetermined threshold and a time-out of the first timer occurs, the mobile terminal records a report about the measurement, starts a second timer arranged therein, and prohibits the measurement during the measurement operation of the second timer.

[31] In the radio communication method according to the above [27] or [28], when radio quality of a single cell becomes less than or equal to a predetermined threshold, the mobile terminal starts a first timer arranged therein and periodically measures radio quality of a cell neighboring to the single cell, when radio quality of the single cell exceeds the predetermined threshold, the mobile terminal stops the first timer and starts a second timer arranged therein, and when the second timer times out while the first timer is stopped and the radio quality is above a predetermined threshold, the mobile terminal resets the first timer.

[32] In the radio communication method according to the above [28], when radio quality of a handover source cell becomes less than or equal to a predetermined threshold during a handover, the mobile terminal starts a measurement report management timer arranged therein, and upon completion of the handover, the mobile terminal stops the timer.

[33] In the radio communication method according to the above [28], the mobile terminal sets the threshold to be a predetermined value so that radio quality of a cell is always above the threshold, and when radio quality of a handover source cell becomes less than or equal to a predetermined threshold during a handover, the mobile terminal does not start a timer arranged therein and used to manage the time relating to a measurement report or the mobile terminal sets a time-out period of the timer to be longer than the time required for the handover.

[34] In the radio communication method according to the above [28], the mobile terminal cancels processing relating to the threshold during a handover in an active mode or an idle mode.

[35] In the radio communication method according to the above [28], the mobile terminal sets the threshold to be a predetermined value in a cell at a network border, and when radio quality of the cell exceeds the threshold, the mobile terminal prohibits the measurement in the cell at the network border.

[36] In the radio communication method according to the above [28], the mobile terminal is connected to a plurality of carriers/RATs (Radio Access Technologies), and sets, for each of the carriers/RATs, the threshold or a time-out period of a timer that is arranged in the mobile terminal and that is used to manage the time relating to a measurement report.

[37] In the radio communication method according to the above [36], the mobile terminal sets parameters of the timer in consideration of the time required for an inter-carrier/RAT handover from one carrier/RAT to another carrier/RAT.

[38] In the radio communication method according to the above [36], during an inter-carrier/RAT handover from one carrier/RAT to another carrier/RAT, the mobile terminal cancels processing relating to the threshold.

[39] In the radio communication method according to the above [28], when reception quality of an MBSFN (Multicast Broadcast Single Frequency Network) is less than or equal to a predetermined first threshold, the mobile terminal starts a first timer arranged therein and used to manage measurement reports and periodically measures reception quality of the MBSFN, when a time-out of the first timer occurs, the mobile terminal sends a measurement report to a base station or records a measurement report therein and starts a second timer arranged therein and used to manage measurement prohibition, and when a time-out of the second timer occurs, the mobile terminal starts the first timer and periodically measures reception quality of the MBSFN.

[40] In the radio communication method according to the above [39], at the time of a time-out of the first timer, which is started when a time-out of the second timer occurs, the mobile terminal sends a report about the measurement to a base station or records a report about the measurement therein and starts the second timer, when a time-out of the second timer occurs, the mobile terminal starts a third timer arranged therein and periodically measures reception quality of the MBSFN based on the third timer, and when reception quality of the MBSFN is below a predetermined second threshold and a time-out of the third timer occurs, the mobile terminal starts the second timer.

[41] In the radio communication method according to the above [40], when a time-out of the first to third timers occurs, the first and second thresholds are transmitted to the mobile terminal via MCCH as part of control information for corresponding MCCH (MBMS (Multimedia Broadcast/Multicast Service) Control CHannel) transmission.

[42] According to an exemplary embodiment of the present invention, there is provided a radio communication method in which, when reception quality of an MBSFN (Multicast Broadcast Single Frequency Network) falls below a predetermined threshold, the mobile terminal measures another cell.

[43] According to an exemplary embodiment of the present invention, there is provided a program causing a computer included in a mobile terminal to execute processing comprising:

determining, in accordance with reception quality of a radio signal from a base station, a measurement cycle of a predetermined measurement on a link status and/or on/off of the predetermined measurement and controlling execution of the predetermined measurement based on the determination.

[44] According to an exemplary embodiment of the present invention, there is provided a program causing a computer included in a mobile terminal to execute processing comprising:

comparing radio quality of a cell with a predetermined threshold and controlling a measurement on a link status performed by the mobile terminal based on whether the radio quality of the cell is higher or lower than the threshold.

[45] The program according to the above [43] or [44] includes a program causing the computer to execute processing comprising:

starting, when radio quality of a single cell becomes less than or equal to a predetermined threshold, a timer arranged in the mobile terminal and periodically measuring radio quality of a cell neighboring to the single cell;

stopping, when radio quality of the single cell exceeds the predetermined threshold, the measurement operation of the timer and the periodic measurement of the radio quality of the neighbor cell, as long as the radio quality of the single cell is above the predetermined threshold;

resuming, when radio quality of the single cell becomes less than or equal to the predetermined threshold, the measurement operation of the timer; and recording a measurement report when a time-out of the timer occurs.

[46] The program according to the above [43] or [44] includes a program characterized in that the computer to execute processing comprising:

starting, when radio quality of a single cell becomes less than or equal to a predetermined threshold, a first timer arranged in the mobile terminal and periodically measuring radio quality of a cell neighboring to the single cell;

recording, when radio quality of the single cell is less than or equal to the predetermined threshold and a time-out of the first timer occurs, a report about the measurement and starting a second timer arranged in the mobile terminal; and prohibiting the measurement during the measurement operation of the second timer.

[47] The program according to the above [43] or [44] includes a program characterized in that the computer to execute processing comprising:

starting, when radio quality of a single cell becomes less than or equal to a predetermined threshold, a first timer arranged in the mobile terminal and periodically measuring radio quality of a cell neighboring to the single cell;

stopping, when radio quality of the single cell exceeds the predetermined threshold, the first timer and starting a second timer arranged in the mobile terminal; and resetting the first timer when the second timer times out while the first timer is stopped and the radio quality is above a predetermined threshold.

[48] The program according to any one of the above [43] to [47] includes a program causing the computer to execute processing comprising:

starting, when radio quality of a handover source cell becomes less than or equal to a predetermined threshold during a handover, a measurement report management timer arranged in the mobile terminal, and stopping the timer upon completion of the handover.

[49] The program according to the above [44] includes a program causing the computer to execute processing comprising:

setting the threshold to be a predetermined value so that radio quality of a cell is always above the threshold, and prohibiting, when radio quality of a handover source cell becomes less than or equal to a predetermined threshold during a handover, a timer arranged in the mobile terminal and used to manage the time relating to a measurement report from being started or setting a time-out period of the timer to be longer than the time required for the handover.

[50] The program according to the above [44] includes a program causing the computer to execute processing comprising:

cancelling processes relating to the threshold during a handover in an active mode or an idle mode.

[51] The program according to the above [44] includes a program causing the computer to execute processing comprising:

setting the threshold to be a predetermined value in a cell at a network border and prohibiting the measurement in the cell at the network border when radio quality of the cell exceeds the threshold.

[52] The program according to the above [44] includes a program causing the computer to execute processing comprising:

establishing connection to a plurality of carriers/RATs (Radio Access Technologies), and setting, for each of the carriers/RATs, the threshold or a time-out period of a timer that is arranged in the mobile terminal and that is used to manage the time relating to a measurement report.

[53] The program according to the above [52] includes a program causing the computer to execute processing comprising:

setting parameters of the timer in consideration of the time required for an inter-carrier/RAT handover from one carrier/RAT to another carrier/RAT.

[54] The program according to the above [52] includes a program causing the computer to execute processing comprising:

cancelling processes relating to the threshold during an inter-carrier/RAT handover from one carrier/RAT to another carrier/RAT.

[55] The program according to the above [44] includes a program causing the computer to execute processing comprising:

starting, when reception quality of an MBSFN (Multicast Broadcast Single Frequency Network) is less than or equal to a predetermined first threshold, a first timer arranged in the mobile terminal and used to manage measurement reports and periodically measuring reception quality of the MBSFN, transmitting a measurement report to a base station or recording a measurement report in a mobile terminal and starting a second timer used to manage measurement prohibition when a time-out of the first timer occurs, and starting the first timer and periodically measuring reception quality of the MBSFN when a time-out of the second timer occurs.

[56] The program according to the above [55] includes a program causing the computer to execute processing comprising:

transmitting a report about the measurement to a base station or recording a report about the measurement in a mobile terminal and starting the second timer at the time of a time-out of the first timer, which is started when a time-out of the second timer occurs, starting a third timer and periodically measuring reception quality of the MBSFN when a time-out of the second timer occurs, and starting the second timer when reception quality of the MBSFN is below a predetermined second threshold and a time-out of the third timer occurs.

[57] The program according to the above [56] includes a program causing the computer to execute processing comprising:

receiving, when a time-out of the first to third timers occurs, the first and second thresholds transmitted via MCCH as part of control information for MCCH (MBMS (Multimedia Broadcast/Multicast Service) Control CHannel) transmission.

[58] The program according to the above [44] includes a program causing the computer to execute processing comprising:

measuring another cell when reception quality of an MBSFN (Multicast Broadcast Single Frequency Network) falls below a predetermined threshold.

[59] According to an exemplary embodiment of the present invention, there is provided a system in which a mobile terminal is set in a predetermined mode responsive to an indication transmitted from a base station side and the mobile terminal in the predetermined mode determines a measurement cycle of a predetermined measurement on a link status performed by the mobile terminal to obtain link status information reported to a base station and/or on/off of the predetermined measurement, based on comparison results between measurement results of reception quality of a radio signal from a base station and a predetermined threshold, and controls execution of the predetermined measurement based on the determination.

Modifications and adjustments of the exemplary embodiments and examples are possible within the scope of the overall disclosure (including claims) of the present invention and based on the basic technical concept of the present invention. Various combinations and selections of various disclosed elements are possible within the scope of the claims of the present invention. The present invention of course includes various variations and modifications that could be made by those skilled in the art according to the overall disclosure including the claims and the technical concept.

The invention claimed is:

1. A base station, comprising:
a transmitter configured to transmit to a mobile station a signal for performing a measurement of a first cell quality value of a first cell; and
a receiver configured to receive a result signal including a result of the measurement and a position information from the mobile station, wherein
the mobile station performs the measurement and associates the position information with the result in response to a second cell quality of a second cell being equal to or less than a threshold,
wherein the second cell quality of the second cell is measured by the mobile station.

2. A communication method, comprising:
by a base station, transmitting to a mobile station a signal for performing a measurement of a first cell quality of a first cell; and
receiving a result signal including a result of the measurement and a position information from the mobile station, wherein
the mobile station performs the measurement and associates the position information with the result in response to a second cell quality of a second cell being equal to or less than a threshold,
wherein the second cell quality of the second cell is measured by the mobile station.

3. A base station, comprising:
a receiver configured to receive a result signal including a result of a measurement of a first cell quality value based on a signal transmitted from a first cell and a position information available in a mobile station from the mobile station; wherein
the mobile station comprising:
a first unit to compare a measured second cell quality value based on a signal transmitted from a second cell with a threshold, and to determine whether to perform the measurement of the first cell quality value based on the signal to be transmitted from the first cell, based on a result of the comparison;
a second unit to perform the measurement of the first cell quality value and to associate the position information with the result of the measurement of the first cell quality value, in response to the measured second cell quality value being equal to or less than the threshold; and a third unit to report the result of the measurement of the first cell quality value and the position information to the base station.

4. The base station according to claim 3, wherein the second unit chooses not to perform the measurement of the first cell quality value if the measured second cell quality value is greater than the threshold.

5. The base station according to claim 3, wherein an information indicating the threshold is transmitted from a network to the mobile station.

6. The base station according to claim 3, wherein the result of the measurement of the first cell quality value and the position information are removed at a trigger.

7. The base station according to claim 3, wherein if the base station does not retrieve the result of the measurement of the first cell quality value and the position information, the mobile station stores the result of the measurement of the first cell quality value and the position information until a condition is satisfied.

8. The base station according to claim 3, wherein if radio connection between the mobile station and a network is not established, the third unit reports the result of the measurement of the first cell quality value and the position information to the base station after the radio connection is established.

9. The base station according to claim 3, wherein if radio connection between the mobile station and a network is not established, the third unit reports the result of the measurement of the first cell quality value and the position information to the base station after the radio connection is re-established.

10. The base station according to claim 3, wherein the mobile station is asked by a network to report the result of the measurement of the first cell quality value and the position information.

11. A communication method, comprising:
by a base station, receiving a result signal including a result of a measurement of a first cell quality value based on a signal transmitted from a first cell and a position information available in a mobile station from the mobile station; wherein
the mobile station comprising:
a first unit to compare a measured second cell quality value based on a signal transmitted from a second cell with a threshold, and to determine whether to perform the measurement of the first cell quality value based on the signal to be transmitted from the first cell, based on a result of the comparison;

a second unit to perform the measurement of the first cell quality value and to associate the position information with the result of the measurement of the first cell quality value, in response to the measured second cell quality value being equal to or less than the threshold; and a third unit to report the result of the measurement of the first cell quality value and the position information to the base station.

12. The communication method according to claim 11, wherein the second unit chooses not to perform the measurement of the first cell quality value if the measured second cell quality value is greater than the threshold.

13. The communication method according to claim 11, wherein an information indicating the threshold is transmitted from a network to the mobile station.

14. The communication method according to claim 11, wherein the result of the measurement of the first cell quality value and the position information are removed at a trigger.

15. The communication method according to claim 11, wherein if the base station does not retrieve the result of the measurement of the first cell quality value and the position information, the mobile station stores the result of the measurement of the first cell quality value and the position information until a condition is satisfied.

16. The communication method according to claim 11, wherein if radio connection between the mobile station and a network is not established, the third unit reports the result of the measurement of the first cell quality value and the position information to the base station after the radio connection is established.

17. The communication method according to claim 11, wherein if radio connection between the mobile station and a network is not established, the third unit reports the result of the measurement of the first cell quality value and the position information to the base station after the radio connection is re-established.

18. The communication method according to claim 11, wherein the mobile station is asked by a network to report the result of the measurement of the first cell quality value and the position information.

19. A base station, comprising:
a transmitter configured to transmit to a mobile station a signal for performing a measurement of a first cell quality value of a first cell; and
a receiver configured to receive a result signal including a result of the measurement and a position information from the mobile station only when a second cell quality of a second cell is equal to or less than a threshold,
wherein the second cell quality of the second cell is measured by the mobile station.

* * * * *